(12) United States Patent
Kim et al.

(10) Patent No.: US 9,749,937 B2
(45) Date of Patent: Aug. 29, 2017

(54) METHOD AND DEVICE FOR FAST LINK SYNCHRONIZATION IN WLAN SYSTEM

(71) Applicant: LG ELECTRONICS INC., Seoul (JP)

(72) Inventors: Jeongki Kim, Anyang-si (KR); Kiseon Ryu, Anyang-si (KR); Giwon Park, Anyang-si (KR); Hangyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 212 days.

(21) Appl. No.: 14/439,155

(22) PCT Filed: Oct. 29, 2013

(86) PCT No.: PCT/KR2013/009668
§ 371 (c)(1),
(2) Date: Apr. 28, 2015

(87) PCT Pub. No.: WO2014/069867
PCT Pub. Date: May 8, 2014

(65) Prior Publication Data
US 2015/0249953 A1 Sep. 3, 2015

Related U.S. Application Data

(60) Provisional application No. 61/719,508, filed on Oct. 29, 2012, provisional application No. 61/724,909, filed on Nov. 10, 2012.

(51) Int. Cl.
*H04L 1/00* (2006.01)
*H04W 48/16* (2009.01)
(Continued)

(52) U.S. Cl.
CPC ........ *H04W 48/16* (2013.01); *H04L 41/0859* (2013.01); *H04W 48/14* (2013.01); *H04W 84/12* (2013.01)

(58) Field of Classification Search
CPC ...... H04B 17/00; H04B 3/46; H04B 7/18528; H04B 7/18571; H04B 7/18576;
(Continued)

(56) References Cited

U.S. PATENT DOCUMENTS 7,894,405 B2 2/2011 Zhun
2012/0026909 A1 2/2012 Seok
(Continued)

FOREIGN PATENT DOCUMENTS

KR 1020110071884 A 6/2011
KR 1020110089802 A2 8/2011

*Primary Examiner* — Dady Chery
(74) *Attorney, Agent, or Firm* — Dentons US LLP

(57) ABSTRACT

The present invention relates to a wireless communication system, and more specifically, a method and a device for the scanning of a station (STA) in a WLAN system are disclosed. The whereby an STA performs scanning in a wireless communication system according to one embodiment of the present invention comprises the steps of: transmitting a first frame, including a BSSID-AP CCC pair, to one or more access points (AP); and receiving a second frame from an AP among the one or more ALs, wherein the system information of the AP, which is included in the second frame, includes dynamic information and can configure the second frame to be optimized according to the dynamic information.

18 Claims, 18 Drawing Sheets

(51) Int. Cl.
*H04W 48/14* (2009.01)
*H04L 12/24* (2006.01)
*H04W 84/12* (2009.01)

(58) Field of Classification Search
CPC ..... H04B 7/18541; H04L 43/00; H04L 43/50; H04L 41/04; H04L 41/085; H04L 41/12; H04L 45/02; H04L 47/767; H04W 24/00; H04W 84/18; H04W 84/06
USPC ................ 370/254, 252, 328, 331, 338, 469
See application file for complete search history.

(56) References Cited

U.S. PATENT DOCUMENTS

| | | |
|---|---|---|
| 2012/0076045 A1 | 3/2012 | Pease et al. |
| 2013/0176897 A1* | 7/2013 | Wang .................... H04W 12/06 370/254 |
| 2014/0064261 A1* | 3/2014 | Wang .................... H04W 40/02 370/338 |

* cited by examiner

FIG. 10
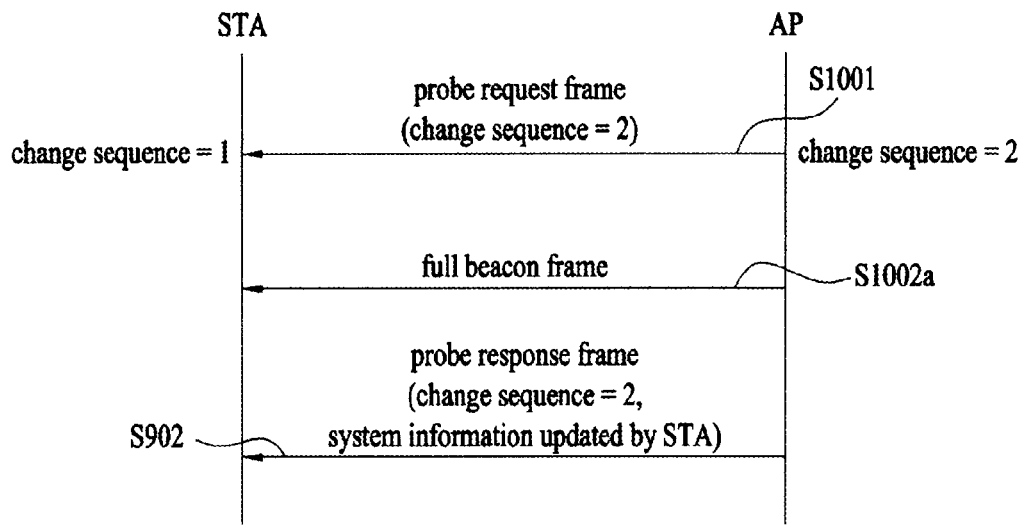
(a)
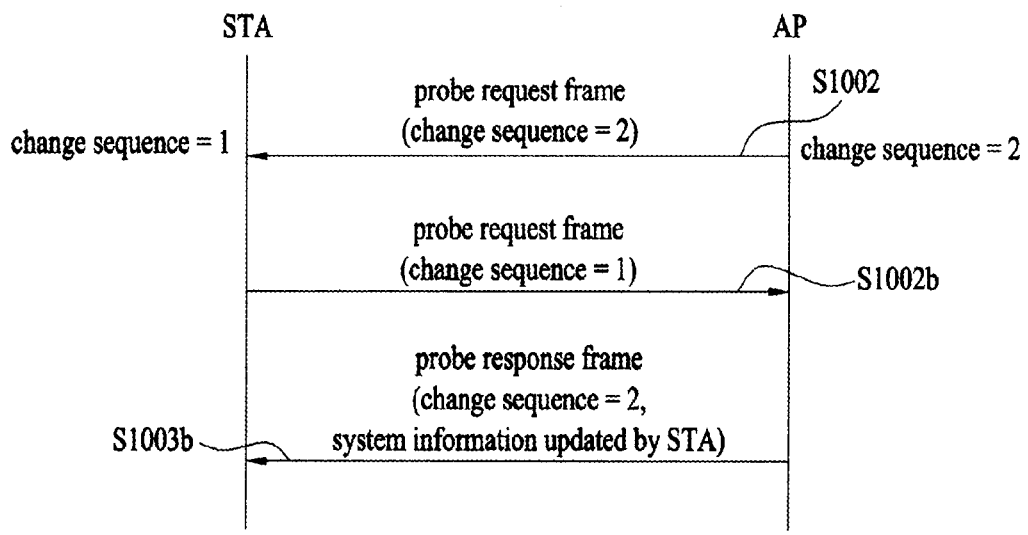
(b)

FIG. 12

| BSSID | AP CCC |
|---|---|
| AP 1 | 3 |
| AP 3 | 4 |
| ... | ... |
| AP N | X |

FIG. 13

| Element ID | Length | BSSID and AP Configuration Change Count |
|---|---|---|
| Octets : 1 | 1 | Variable (N(Number of total pairs*7)) ( 6 (BSSID) + 1(change count) octets) |

FIG. 14

| Element ID | Length | Dynamic Information Presence Bitmap | TPC Report | BSS Load | BSS Average Access Delay | BSS AC Access Delay | Time Advertisement | BSS Available Admission | Beacon Timing |
|---|---|---|---|---|---|---|---|---|---|
| 1 | 1 | 1 | 0 or 2 | 0 or 5 | 0 or 1 | 0 or 4 | 0 or 2-18 | 0 or 3-27 | 0 or 2-54 |

Octets:

FIG. 15

| B0 | B1 | B2 | B3 | B4 | B5 | B6 | B7 |
|---|---|---|---|---|---|---|---|
| TPC Report | BSS Load | BSS Average Access Delay | BSS AC Access Delay | Time Advertisement | BSS Available Admission | Beacon Timing | Reserved |
| 1 | 1 | 1 | 1 | 1 | 1 | 1 | 1 |

Bits:

FIG. 16

| Transmit Power | Link Margin |
|---|---|

Octets :  1  1

FIG. 17

| Station Count | Channel Utilization | Available Admission Capacity |
|---|---|---|

Octets :  2  1  2

FIG. 18

| AP Average Access Delay |
|---|

Octets :  1

FIG. 19

| Access Category Access Delay |
|---|

Octets :        4

FIG. 20

| Length | Timing Capabilities | Timing Value (optional) | Time Error (optional) | Time Update Counter (optional) |
|---|---|---|---|---|
| 1 | 1 | 0 or 10 | 0 or 5 | 0 or 1 |

Octets :

FIG. 21

| Length | Available Admission Capacity Bitmask | Available Admission Capacity List |
|---|---|---|
| 1 | 2 | 2 x (total number of nonzero bits in Available Admission Capacity Bitmask) |

Octets :

FIG. 22

| Length | Report Control | Beacon Timing Information #1 | ... | Beacon Timing Information #N |
|---|---|---|---|---|

Octets: 1  1  6  ...  6

FIG. 23

| FC | DA | SA | Time stamp | Change sequence | Dynamic Information List | Updated Information element | FCS |
|---|---|---|---|---|---|---|---|

Octets: 2  6  6  8  1  Variables  Variables  4

FIG. 24

| Dynamic Information Presence Bitmap | TPC Report | BSS Load | BSS Average Access Delay | BSS AC Access Delay | Time Advertisement | BSS Available Admission | Beacon Timing |
|---|---|---|---|---|---|---|---|

Octets: 1  0 or 2  0 or 5  0 or 1  0 or 4  0 or 2-18  0 or 3-27  0 or 2-54

| B0 | B1 | B2 | B3 | B4 | B5 | B6 | B7 |
|---|---|---|---|---|---|---|---|
| TPC Report | BSS Load | BSS Average Access Delay | BSS AC Access Delay | Time Advertisement | BSS Available Admission | Beacon Timing | Reserved |
| Bits: 1 | 1 | 1 | 1 | 1 | 1 | 1 | 1 |

METHOD AND DEVICE FOR FAST LINK SYNCHRONIZATION IN WLAN SYSTEM

This application is a National Stage Entry of International Application No. PCT/KR2013/0009668, filed Oct. 29, 2013, and claims the priority to and benefit of U.S. Provisional Nos. 61/719,508 filed on Oct. 29, 2012 and 61/724,909 filed on Nov. 10, 2012, all of which are hereby incorporated by reference in their entirety for all purposes as if fully set forth herein.

TECHNICAL FIELD

Following description relates to a wireless communication system, more particularly, to a method of synchronizing a fast link in a wireless LAN system and an apparatus therefor.

BACKGROUND ART

Recently, various wireless communication technologies are developing in accordance with the development of information communication technologies. As one of the various wireless communication technologies, a wireless LAN (WLAN) corresponds to a technology enabling a user to access the internet in wireless at home, a company or an area to which a specific service is provided using such a mobile terminal as a PDA (personal digital assistant), a laptop computer, a PMP (portable multimedia player) and the like based on a wireless frequency technology.

In order to overcome a limitation for the speed of communication, which is pointed out as a weak point of the wireless LAN, a recent technical standard has introduced a system in which network speed and reliability are enhanced and management distance of a wireless network is extended. For instance, IEEE 802.11n has introduced MIMO (multiple inputs and multiple outputs) technology using multiple antennas at both a transmitting end and a receiving end to support HT (high throughput) of which maximum data processing speed is faster than 540 Mbps, minimize a transmission error and optimize data speed.

In order to enable stations (STAs) supporting IEEE 802.11 system to support a fast initial link setup in IEEE 802.11 system MAC (medium access control) layer, a new standard is developing as IEEE 802.11ai. For instance, an object of the IEEE 802.11ai is to provide a technology supporting a fast link setup in a situation that a huge number of users are getting out of a previously connected wireless LAN coverage and practically accessing a new wireless LAN at the same time for a case of transferring a public transportation and the like. And, main characteristics of the IEEE 802. 11ai can be summarized as a security framework, IP address assignment, fast network discovery and the like.

DISCLOSURE OF THE INVENTION

Technical Task

As mentioned in the foregoing description, when a huge number of users actually attempt to access a network at the same time or a huge number of terminals practically perform a random access procedure at the same time, it is required to have a technology providing a fast link setup (or fast session setup). Yet, a concrete method for the fast link setup is not prepared yet.

A technical task of the present invention is to provide a method of minimizing delay of a link setup in a manner of improving an operation of a station (STA) accessing an access point (AP).

Technical tasks obtainable from the present invention are non-limited the above-mentioned technical task. And, other unmentioned technical tasks can be clearly understood from the following description by those having ordinary skill in the technical field to which the present invention pertains.

Technical Solution

In an aspect of the present invention, a method of performing scanning, which is performed by a station (STA) in a wireless communication system, broadcasting a first frame, by the STA, to one or more access points (APs), and receiving a second frame from a first AP among the one or more APs, which have received the broadcasted first frame. The first frame comprises one or more basic service set ID (BSSID)-AP configuration change count (AP CCC) pairs. The first AP is associated with a BSSID of a BSSID-AP CCC pair among the one or more BSSID-AP CCC pairs. If an AP CCC value of the first AP is different from an AP CCC value paired with the BSSID associated with the first AP, the second frame comprise system information of the first AP containing a current AP CCC value of the first AP, updated information element and dynamic information.

In another aspect of the present invention, the current AP CCC value of the first AP is maintained although update occurs on the dynamic information. If update occurs on system information except the dynamic information of the first AP, updated system information is contained in the second frame.

In another aspect of the present invention, the dynamic information comprises at least one of time stamp, BSS load, beacon timing, time advertisement, BSS AC access delay, BSS average access delay, BSS available admission capacity and TPC report element.

In another aspect of the present invention, the AP CCC value of the first AP increases by 1 when update occurs on system information except the dynamic information of the first AP.

In another aspect of the present invention, the first AP comprises an AP CCC list. A change history of the AP CCC value increased by the first AP is stored in the AP CCC list.

In another aspect of the present invention, the STA stores BSSID-AP CCC pair information of one or more APs previously associated with the STA.

In another aspect of the present invention, the AP CCC value is initially configured by 0.

In another aspect of the present invention, the AP CCC value is defined by a size of 1 octet and configured by one among values ranging from 0 to 255.

In another aspect of the present invention, the first frame corresponds to a probe request frame and the second frame corresponds to a probe response frame.

In another aspect of the present invention, if the STA corresponds to a non-AP STA, the first frame is transmitted to a previously associated AP by checking information on the BSSID-AP CCC pair.

In another aspect of the present invention, a method of supporting scanning, which is supported by an access point (AP) in a wireless communication system, receiving a probe request frame, which is broadcasted by a station (STA) and contains one or more basic service set ID (BSSID)-configuration change count (AP CCC) pairs, from the STA, and transmitting a probe response frame to the STA in response to the received probe request frame. The AP is associated with a BSSID of a BSSID-AP CCC pair among the one or more BSSID-AP CCC pairs. If an AP CCC value of the AP is different from an AP CCC value paired with the BSSID associated with the AP, the AP transmits a second frame containing a current AP CCC value of the AP, updated information element and dynamic information to the STA.

In another aspect of the present invention, if the AP CCC value contained in the probe request frame transmitted by the STA is determined as invalid, the current AP CCC value of the AP is transmitted in a manner of being included in a legacy probe response frame.

Advantageous Effects

According to the present invention, it is able to provide a method of efficiently transmitting and receiving system information updated in a scanning process and an apparatus therefor by improving an operation of a station (STA) that scans an access point (AP).

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIGS. 10(a) and 10(b) are flowcharts for explaining an example of performing a fast initial link setup in case of performing passive scanning;

FIG. 12 is a diagram for an example of BSSID-AP CCC pair list according to the present invention;

FIG. 13 is a diagram for an example of a form of BSSID-AP CCC element;

FIG. 14 is a diagram for an example of a dynamic information list element according to the present invention;

FIG. 15 is a diagram for a dynamic information presence bitmap field according to the present invention;

FIG. 16 is a diagram for a format of a TPC report field according to the present invention;

FIG. 17 is a diagram for a format of a BSS load field according to the present invention;

FIG. 18 is a diagram for a format of a BSS average access delay field according to the present invention;

FIG. 19 is a diagram for a format of a BSS AC access delay field according to the present invention;

FIG. 20 is a diagram for a format of a time advertisement field according to the present invention;

FIG. 21 is a diagram for a format of a BSS available admission field according to the present invention;

FIG. 22 is a diagram for a format of a beacon timing field according to the present invention;

FIG. 23 is a diagram for an example of an optimized probe response frame according to the present invention;

FIG. 24 is a diagram for an example of a dynamic information list according to the present invention;

BEST MODE

Mode for Invention

Figure 1:
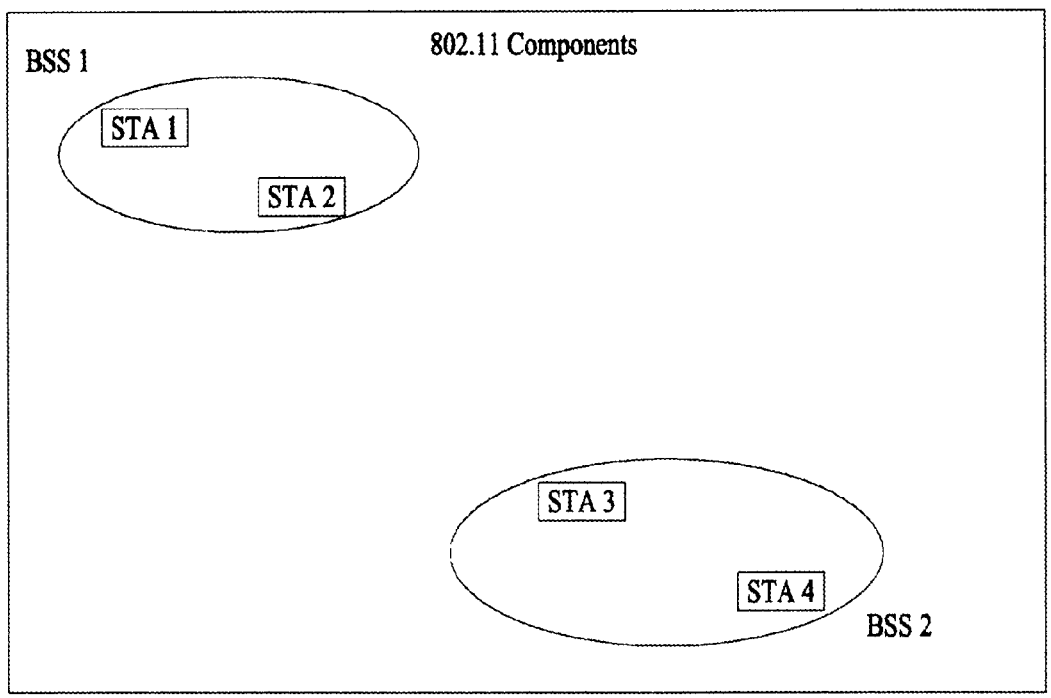
FIG. 1 is a diagram for an example of a structure of IEEE 802.11 system to which the present invention is applicable.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, known structures and devices are omitted or are shown in block diagram form, focusing on important features of the structures and devices, so as not to obscure the concept of the invention. Like reference numerals denote the same components throughout the specification.

The embodiments of the present invention may be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention may be supported by those documents. Further, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA), etc. While the embodiments of the present invention will be described below in the context of an IEEE 802.11 system for clarity of description, this is purely exemplary and thus should not be constructed as limiting the present invention.

Architecture of Wireless Local Area Network (WLAN) System

FIG. 1 illustrates an exemplary configuration of an IEEE 802.11 system to which the present invention is applicable.

The IEEE 802.11 architecture may include a plurality of components. A WLAN that supports Station (STA) mobility transparent to upper layers may be provided through interaction between the components. A Basic Service Set (BSS) is a basic building block of an IEEE 802.11 LAN. FIG. 1 illustrates two BSSs, BSS1 and BSS2, each with two STAs that are members of the BSS (STA1 and STA2 are included in BSS1 and STA3 and STA4 are included in BSS2). Each of the BSSs covers an area in which the STAs of the BSS maintain communication, as indicated by an oval. This area may be referred to as a Basic Service Area (BSA). As an STA moves out of its BSA, it may no longer communicate directly with other members of the BSA.

An Independent Basic Service Set (IBSS) is the most basic type of BSS in the IEEE 802.11 LAN. For example, a minimum IBSS includes only two stations. A BSS, BSS1 or BSS2 which is the most basic type without other components in FIG. 1 may be taken as a major example of the IBSS. This configuration may be realized when STAs communicate directly. Because this type of LAN is often formed without pre-planning for only as long as the LAN is needed, it is often referred to as an ad hoc network.

The membership of an STA in a BSS may be dynamically changed when the STA is powered on or off or the STA moves into or out of the coverage area of the BSS. To be a member of the BSS, an STA may join the BSS by synchronization. To access all services of a BSS infrastructure, the STA should be associated with the BSS. This association may be dynamically performed and may involve use of a Distributed System Service (DSS).

Figure 2:
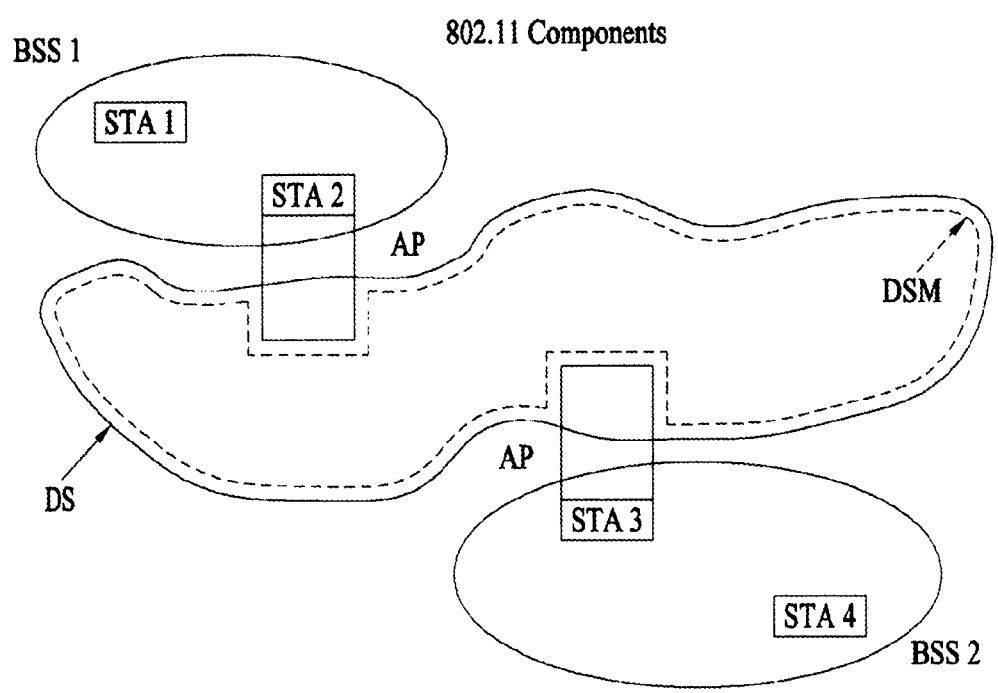
FIG. 2 is a diagram for a different example of a structure of IEEE 802.11 system to which the present invention is applicable.

FIG. 2 illustrates another exemplary configuration of the IEEE 802.11 system to which the present invention is applicable. In FIG. 2, components such as a Distribution System (DS), a Distribution System Medium (DSM), and an Access Point (AP) are added to the architecture illustrated in FIG. 1.

Physical (PHY) performance may limit direct STA-to-STA distances. While this distance limitation is sufficient in some cases, communication between STAs apart from each other by a long distance may be required. To support extended coverage, a DS may be deployed.

A DS is built from multiple BSSs that are interconnected. Specifically, a BSS may exist as a component of an extended network with a plurality of BSSs, rather than it exists independently as illustrated in FIG. 1.

The DS is a logical concept and may be specified by the characteristics of a DSM. In this regard, the IEEE 802.11 standard logically distinguishes a Wireless Medium (WM) from a DSM. Each logical medium is used for a different purpose by a different component. The IEEE 802.11 standard does not define that these media should be the same or different. The flexibility of the IEEE 802.11 LAN architecture (DS structure or other network structures) may be explained in the sense that a plurality of media are logically different. That is, the IEEE 802.11 LAN architecture may be built in various manners and may be specified independently of the physical characteristics of each implementation example.

The DS may support mobile devices by providing services needed to handle address to destination mapping and seamless integration of multiple BSSs.

An Access Point (AP) is an entity that enables its associated STAs to access a DS through a WM and that has STA functionality. Data may move between the BSS and the DS through the AP. For example, STA2 and STA3 illustrated in FIG. 2 have STA functionality and provide a function of enabling associated STAs (STA1 and STA4) to access the DS. Since all APs are basically STAs, they are addressable entities. An address used by an AP for communication on the WM is not necessarily identical to an address used by the AP for communication on the DSM.

Data that one of STAs associated with the AP transmits to an STA address of the AP may always be received at an uncontrolled port and processed by an IEEE 802.1X port access entity. Transmission data (or frames) may be transmitted to the DS when a controlled port is authenticated.

Figure 3:
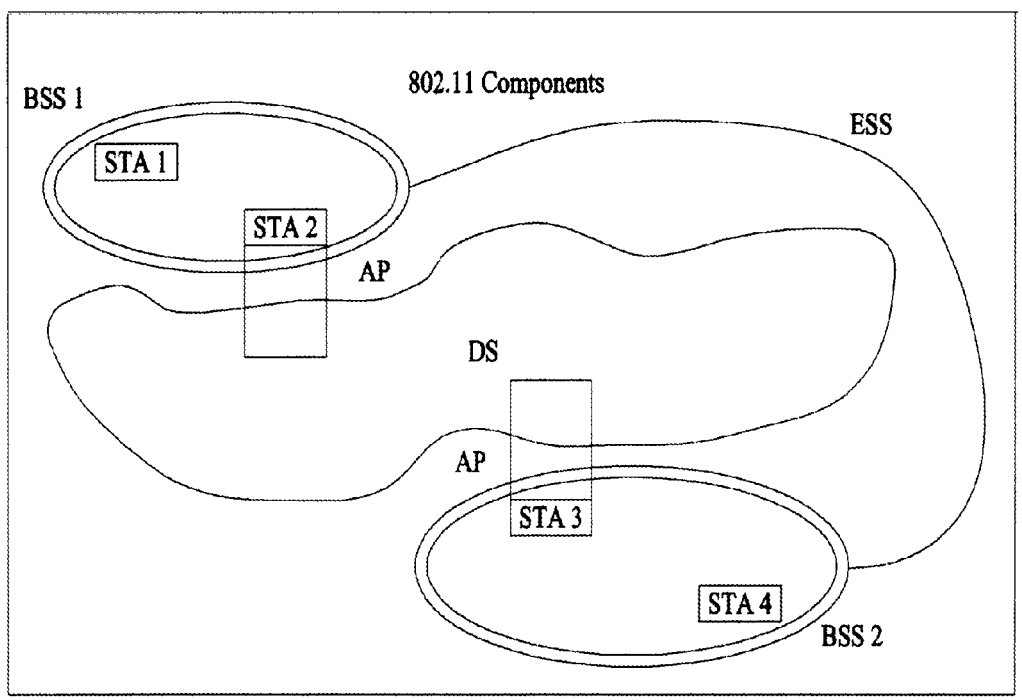
FIG. 3 is a diagram for a further different example of a structure of IEEE 802.11 system to which the present invention is applicable.

FIG. 3 illustrates another exemplary configuration of the IEEE 802.11 system to which the present invention is applicable. In addition to the architecture illustrated in FIG. 2, FIG. 3 conceptually illustrates an Extended Service Set (ESS) to provide extended coverage.

A DS and BSSs allow IEEE 802.11 to create a wireless network of arbitrary size and complexity. IEEE 802.11 refers to this type of network as an ESS network. An ESS may be a set of BSSs connected to a single DS. However, the ESS does not the DS. The ESS network appears as an IBSS network to a Logical Link Control (LLC) layer. STAs within an ESS may communicate with each other and mobile STAs may move from one BSS to another (within the same ESS) transparently to the LLC layer.

IEEE 802.11 assumes nothing about the relative physical locations of the BSSs in FIG. 3. All of the followings are possible. The BSSs may partially overlap. This is commonly used to arrange contiguous coverage. The BSSs may be physically disjointed. Logically, there is no limit to the distance between BSSs. The BSSs may be physically co-located. This may be done to provide redundancy. One (or more) IBSS or ESS networks may be physically present in the same space as one (or more) ESS networks. This may arise when an ad hoc network is operating at a location that also has an ESS network, when physically overlapping IEEE 802.11 networks have been set up by different organizations, or when two or more different access and security policies are needed at the same location.

Figure 4:
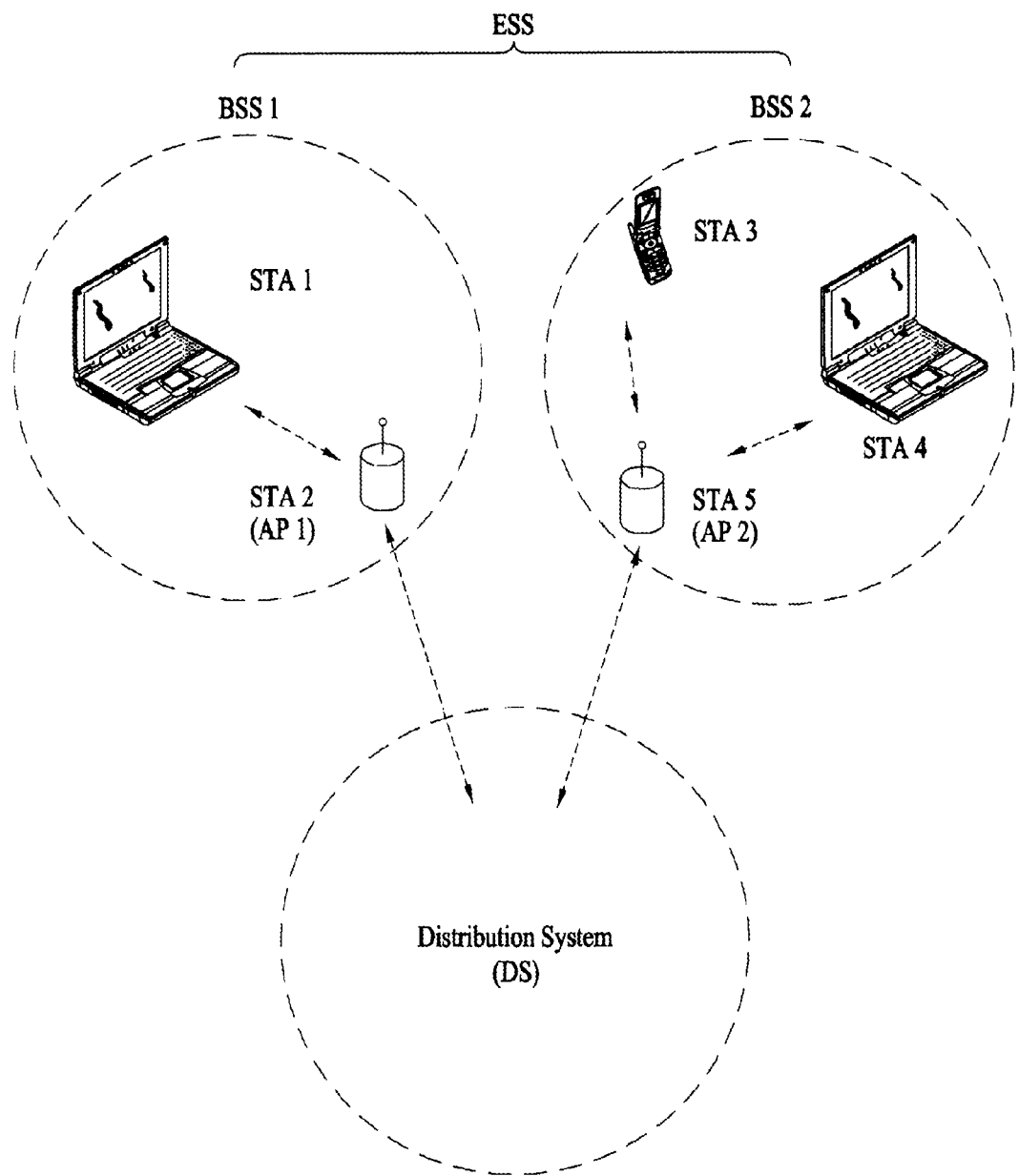
FIG. 4 is a diagram for an example of a structure of a WLAN system.

FIG. 4 illustrates an exemplary configuration of a WLAN system. In FIG. 4, an exemplary infrastructure BSS including a DS is illustrated.

In the example of FIG. 4, an ESS includes BSS1 and BSS2. In the WLAN system, an STA is a device complying with Medium Access Control/Physical (MAC/PHY) regulations of IEEE 802.11. STAs are categorized into AP STAs and non-AP STAs. The non-AP STAs are devices handled directly by users, such as laptop computers and mobile phones. In FIG. 4, STA1, STA3, and STA4 are non-AP STAs, whereas STA2 and STA5 are AP STAs.

In the following description, a non-AP STA may be referred to as a terminal, a Wireless Transmit/Receive Unit (WTRU), a User Equipment (UE), a Mobile Station (MS), a Mobile Terminal (MT), or a Mobile Subscriber Station (MSS). An AP corresponds to a Base Station (BS), a Node B, an evolved Node B (eNB), a Base Transceiver System (BTS), or a femto BS in other wireless communication fields.

Link Setup Procedure

Figure 5:
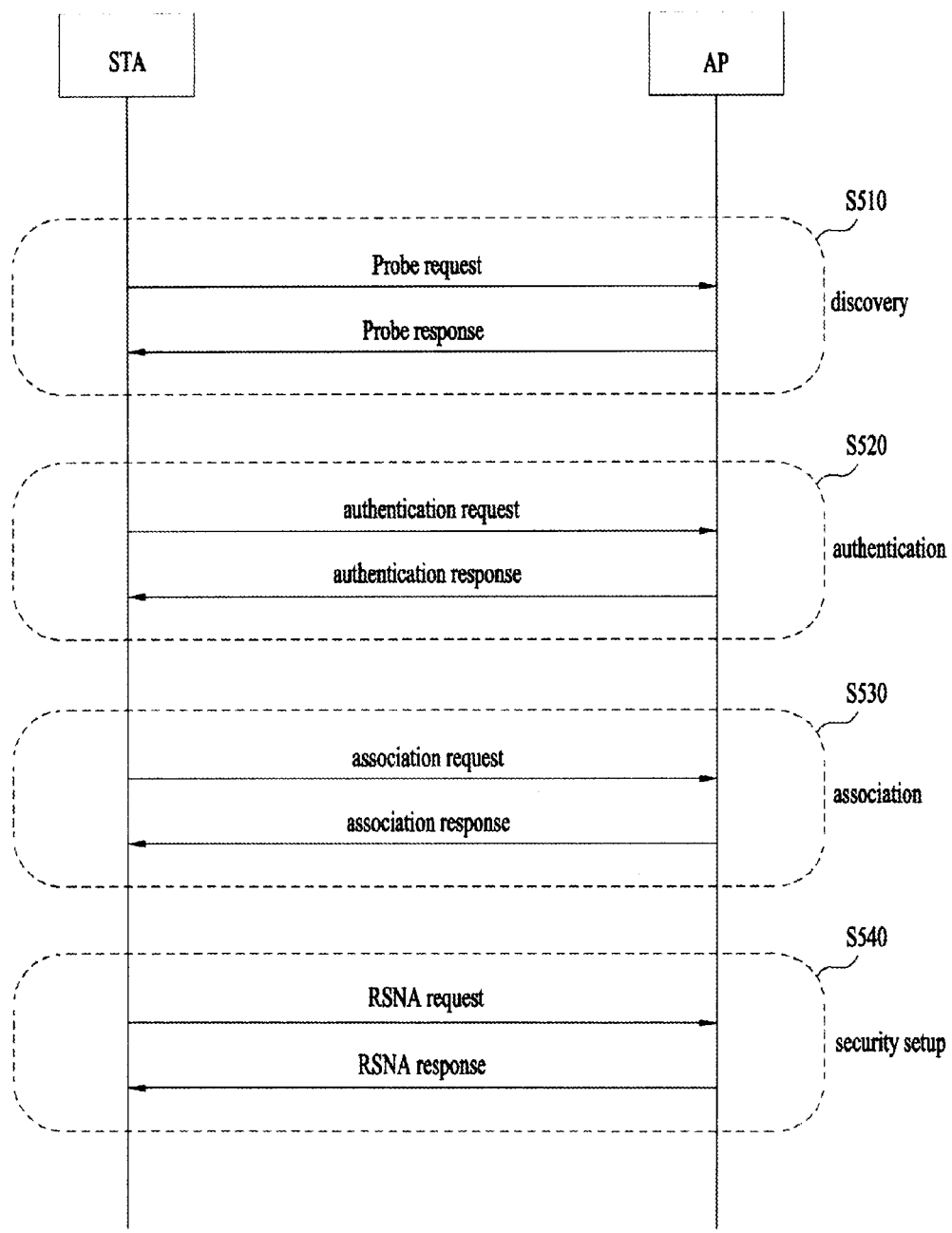
FIG. 5 is a flowchart for explaining a general link setup process.

FIG. 5 is a view referred to for describing a general link setup procedure.

In order to establish a link with a network and transmit and receive data to and from the network, an STA should discover, authenticate, associate with, and perform an authentication procedure for security with the network. The link setup procedure may be referred to as a session initiation procedure or a session setup procedure. Discovery, authentication, association, and security setup of the link setup procedure may be collectively called an association procedure.

An exemplary link setup procedure will be described below with reference to FIG. 5.

In step S510, an STA may discover a network. The network discovery may include the STA's scanning. That is, the STA should search for a joinable network to access the network. The STA needs to identify a compatible network before joining a wireless network. Identification of a network present in a specific area is referred to as scanning.

Scanning is categorized into active scanning and passive scanning.

FIG. 5 illustrates a network discovery operation including active scanning, by way of example. An STA performing active scanning transmits a probe request frame and awaits reception of a response to the transmitted probe request frame, while switching between channels, to determine which AP is present around the STA. A responder transmits a probe response frame in response to the probe request frame to the STA that has transmitted the probe request frame. Here, the responder may be an STA that has transmitted a last beacon frame in a BSS of the scanned channel. Since an AP transmits a beacon frame in a BSS, the AP is a responder. Since STAs sequentially transmit a beacon frame, a responder is not the same in an IBSS. For example, an STA, which has transmitted a probe request frame in channel #1 and has received a probe response frame in channel #1, stores BSS-related information included in the received probe response frame, and moves to the next channel (e.g. channel #2). In the same manner, the STA may perform scanning on the next channel (i.e. probe request/response transmission and reception in channel #2).

While not shown in FIG. 5, the scanning may be passive scanning. An STA that performs passive scanning awaits reception of a beacon frame while moving from one channel to another. The beacon frame is one of management frames in IEEE 802.11. The beacon frame is periodically transmitted to announce the presence of a wireless network and allow a scanning STA to search for the wireless network and thus join the wireless network. In a BSS, an AP is configured to periodically transmit a beacon frame, whereas in an IBSS, STAs are configured to sequentially transmit a beacon frame. Upon receipt of a beacon frame, a scanning STA stores BSS-related information included in the beacon frame and moves to another channel. In this manner, the STA stores beacon frame information on each channel. Upon receipt of the beacon frame, the STA may store BSS-related information included in the received beacon frame, move to the next channel, and perform scanning on the next channel in the same manner.

Active scanning is more advantageous than passive scanning in terms of delay and power consumption.

After discovering the network, the STA may perform an authentication procedure in step S520. The authentication procedure may be referred to as a first authentication procedure to be distinguished from a security setup procedure performed in step S540.

The authentication procedure includes transmission of an authentication request frame to an AP by an STA and transmission of an authentication response frame to the STA by the AP in response to the authentication request frame. The authentication frame used for authentication request/response is a management frame. It includes information such as below tables.

TABLE 1

| Order | Information | Notes |
|---|---|---|
| 1 | Authentication algorithm number | |
| 2 | Authentication transaction sequence number | |
| 3 | Status code | The status code information is reserved in certain Authentication frames. |
| 4 | Challenge text | The challenge text element is present only in certain Authentication frames. |
| 5 | RSN | The RSNE is present in the FT Authentication frames. |
| 6 | Mobility Domain | The MDE is present in the FT Authentication frames. |
| 7 | Fast BSS Transition | An FTE is present in the FT Authentication frames. |
| 8 | Timeout Interval (reassociation deadline) | A Timeout Interval element (TIE) containing the reassociation deadline interval is present in the FT Authentication frames. |
| 9 | RIC | A Resource Information Container, containing a variable number of elements, is present in the FT Authentication frames. |
| 10 | Finite Cyclic Group | An unsigned integer indicating a finite cyclic group. This is present in SAE authentication frames |
| 11 | Anti-Clogging Token | A random bit-string used for anti-clogging purposes. This is present in SAE authentication frames. |
| 12 | Send-Confirm | A binary encoding of an integer used for anti-replay purposes. This is present in SAE authentication frames |
| 13 | Scalar | An unsigned integer encoded. This is present in SAE authentication frames |

TABLE 1-continued

| Order | Information | Notes |
|---|---|---|
| 14 | Element | A field element from a finite field encoded. This is present in SAE authentication frames |
| 15 | Confirm | An unsigned integer encoded. This is present in SAE authentication frames |
| Last | Vendor Specific | One or more vendor-specific elements are optionally present. These elements follow all other elements. |

In Table 1, an authentication algorithm number field indicates a single authentication algorithm and has a length of 2 octets. For instance, values of the authentication algorithm number field 0, 1, 2 and 3 indicate an open system, a shared key, a fast BSS transition and SAE (simultaneous authentication of equals), respectively.

An authentication transaction sequence number field indicates a current status among transaction (or process) of a plurality of steps and has a length of 2 octets.

A status code field is used in a response frame, indicates whether a requested operation (e.g., an authentication request) is successful or failure and has a length of 2 octets.

A challenge text field includes a challenge text in authentication exchange and a length of the challenge text field is determined according to an authentication algorithm and a transaction sequence number.

An RSN (robust security network) field includes cipher-related information and has a length of maximum 255 octets. An RSNE (RSN element) is included in a FT (fast BSS transition) authentication frame. A mobility domain field includes a mobility domain identifier (MD ID) and FT capability and policy field. The mobility domain field can be used to advertise an AP group (i.e., a set of APs constructing a mobility domain) to which an AP belongs thereto. A fast BSS transition field includes information necessary for performing a FT authentication sequence while a fast BSS transition is performed in an RSN. A timeout interval field includes a reassociation deadline interval. A resource information container (RIC) field corresponds to a set of one or more elements related to a resource request/response. The RIC field can include elements (i.e., elements indicating a resource) of a variable number.

A finite cyclic group field indicates a cryptographic group used in SAE exchange and has an integer value not including a sign (unsigned) indicating a finite cyclic group. An anti-clogging token field is used for SAE authentication to protect denial-of-service and is configured by a random bit string. A send-confirm field is used for response prevention in SAE authentication and has a binary-coded integer value. A Scalar field is used to give and take cipher-related information in SAE authentication and has an integer value not including an encoded sign. An element field is used to give and take an element of a restricted field in SAE authentication. A confirmation field is used to verify possession of an encryption key in SAE authentication and has an integer value not including an encoded sign.

A vendor specific field can be used for vendor-specific information not defined by IEEE 802.11 standard.

Table 1 shown in the foregoing description shows a partial example of information capable of being included in an authentication request/response frame. Additional information can be further included in Table 1.

For instance, an STA can transmit an authentication request frame consisting of one or more fields of Table 1 to an AP. The AP can determine whether to permit authentication for the STA based on information included in the received authentication request frame. For instance, the AP can provide a result of the authentication process to the STA via an authentication response frame consisting of one or more fields shown in Table 1.

After the STA is successfully authenticated, an association process can be performed in the step S530. The association process includes processes that the STA transmits an association request frame to the AP and the AP transmits an association response frame to the STA in response to the association request frame.

For instance, the association request frame can include information on various capabilities and information on a beacon listening interval, an SSID (service set identifier), supported rates, supported channels, an RSN, a mobility domain, supported operating classes, a TIM (traffic indication map) broadcast request, interworking service capability and the like.

For instance, the association response frame can include information on various capabilities and information on a status code, an AID (association ID), supported rates, EDCA (enhanced distributed channel access) parameter set, an RCPI (received channel power indicator), an RSNI (received signal to noise indicator), a mobility domain, a timeout interval (association comeback time), an overlapping BSS scan parameter, a TIM broadcast response, a QoS map and the like.

The above mentioned example shows a partial example of information capable of being included in the association request/response frame. Additional information can be further included in the association request/response frame.

After the STA is successfully associated with a network, a security setup process can be performed in the step S540. The security setup process performed in the step S540 may correspond to an authentication process performed via an RSNA (robust security network association) request/response. The authentication process performed in the step S520 can be called a first authentication process and the security setup process performed in the step S540 can be simply called an authentication process.

For instance, the security setup process performed in the step S540 can include a process of performing a private key setup via 4-way handshaking via through an EAPOL (extensible authentication protocol over LAN) frame. The security setup process can be performed according to a security scheme not defined by IEEE 802.11 standard.

Figure 6:
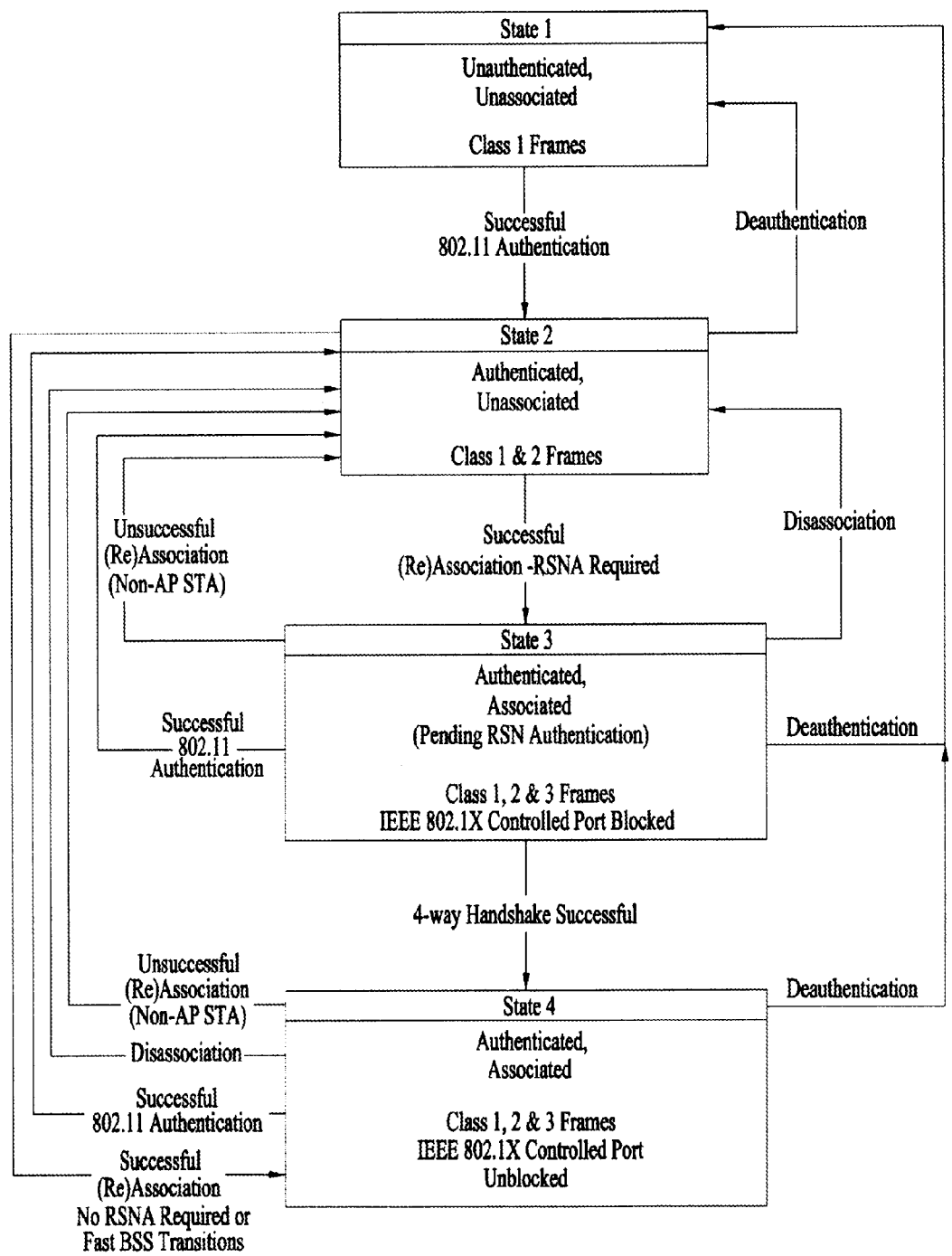
FIG. 6 is a conceptual diagram for explaining a status transition of an STA.

FIG. 6 is a conceptual diagram for explaining a status transition of an STA. In FIG. 6, for clarity, events causing a state change are shown only.

A state 1 corresponds to a state that an STA is unauthenticated and unassociated. The STA of the state 1 can transceive class 1 frames only with a different ST. For instance, a class 1 frame includes a management frame including a probe response/request frame, a beacon frame, an authentication frame, a de-authentication frame and the like.

If the STA of the state 1 is successfully authenticated (e.g., authentication corresponding to the step S520 in FIG. 5), a state of the STA is changed to a state 2. In particular, although the state 2 is authenticated, the STA is in an unassociated state. In this case, the STA can transceive class 1 and 2 frames only with a different STA. For instance, a class 2 frame includes a management frame including an association request/response frame, a reassociation request/response frame, a dissociation frame and the like.

If the STA of the state 2 is de-authenticated, the STA returns to the state 1. When the STA of state 2 is successfully associated, if an RSNA is not requested, if a fast BSS transition is performed, the state 2 is directly changed to a state 4.

Meanwhile, if the STA of the state 2 is successfully associated (or re-associated), a state of the STA is changed to a state 3. In particular, the state 3 corresponds to an authenticated and associated state but the state that RSNA authentication (e.g., security setup corresponding to the step S540 of FIG. 5) is not completed yet. Although the STA of the state 3 can transmit class 1, 2 and 3 frames, IEEE 802.1x control port is in a blocked state. The class 3 frame includes a management frame including a data frame, an action frame and the like, a control frame including a block ACK frame, and the like transceived between STAs in an infrastructure BSS.

If the STA of the state 3 is dissociated or fails to associate, the STA returns to the state 2. If the STA of the state 3 is de-authenticated, the STA returns to the state 1.

If the STA of the state 3 successfully performs 4-way handshaking, the state of the STA is changed to a state 4. The STA of the state 4 corresponds to an authenticated and associated state and is able to transmit a class 1, 2 and 3 frames. The state 4 corresponds to a state that the IEEE 802.1x control port is unblocked.

If the STA of the state 4 is dissociated or fails to associate, the STA returns to the state 2. If the STA of the state 4 is de-authenticated, the STA returns to the state 1.

Improved Method of Performing Scanning

According to a scanning scheme defined by a current wireless communication system (e.g., WLAN system) mentioned earlier in the foregoing description, the scanning scheme can be classified into an active scanning and a passive scanning. An STA performing the active scanning transmits a probe request frame and waits for a response in response to the probe request frame to discover existence of surrounding APs while changing channels. A responder transmits a probe response frame to the STA, which have transmitted the probe request frame, in response to the probe request frame.

An STA transmits a probe request frame to an AP via active scanning, receives a probe response frame from the AP in response to the probe request frame and may be able to obtain system information included in the probe response frame. And, information (e.g., change sequence (or version) information) indicating whether system information is changed can be included in the probe response frame. Since the change sequence information is counted by 1 whenever system information is changed, the change sequence information can also be called (AP) configuration change count (CC) information.

In case that system information of an AP changes, an STA may be unable to reflect the changed system information in real time. When a probe request/response frame is used to perform scanning, if the changed system information is constantly transmitted and received, overhead may occur on both the AP and the STA.

When an STA performs active scanning and an AP becomes a target of the scanning, the present embodiment proposes a method for the STA to receive changed system information of the AP.

Information indicating whether system information is changed can be defined by a change sequence field or a configuration change sequence field. Specifically, when system information (e.g., non-dynamic system information) except dynamic elements (dynamic system information) such as timestamp information and the like is changed, a value of the change sequence field is defined to be increased by 1 and the value may correspond to one of values ranging from 0 to 255 (i.e., modulo 256 is applied). As mentioned in the foregoing description, the change sequence field can also be called (AP) configuration change count (CCC) field since the field is counted by 1 whenever system information is changed. If a value of a change sequence included in a beacon or a probe response frame is maintained in a manner of being identical to a previous value, an STA can immediately determine it as the rest of fields included in a beacon frame or a probe response frame are not changed and may be then able to disregard the rest of the fields. Yet, although a value of a change sequence is not changed, the STA can be configured to obtain dynamic information(s) such as timestamp value and the like.

Short Beacon

In general, a beacon frame includes a MAC header, a frame body and FCS. The frame body can include fields in the following.

A timestamp field is used for synchronization. Every STA, which has received a beacon frame, can change/update a local clock of its own in accordance with a timestamp value.

A beacon interval field indicates time interval between beacon transmissions and is represented by a time unit (TU). TU can be configured by a micro second (μs) unit. For instance, the TU can be defined by 1024 μs. Timing of transmitting a beacon, which should be transmitted by an AP, can be represented as TBTT (target beacon transmission time). In particular, the beacon interval field corresponds to a time interval between timing of transmitting a beacon frame and a next TBTT. Having received a previous beacon, an STA can calculate transmission timing of a next beacon based on the beacon interval field. In general, a beacon interval can be configured by 100 TU.

A capability information field includes information on capability of a device/network. For instance, a network type of an ad hoc or an infrastructure network can be indicated by the capability information field. And, the capability information field can also be used for notifying whether falling is supported, detailed content on encryption and the like.

Besides, an SSID, supported rates, a FH (frequency hopping) parameter set, a DSSS (direct sequence spread spectrum) parameter set, a CF (contention free) parameter set, an IBSS parameter set, a TIM, a country IE, a power constraint, QoS capability, HT (high-throughput) capability and the like can be included in a beacon frame. Yet, the aforementioned field/information included in a beacon frame is just an example. A beacon frame mentioned in the present invention may be non-limited by the aforementioned example.

Unlike a general beacon frame mentioned earlier in the foregoing description, it may be able to define a short beacon frame. In order to distinguish a legacy general beacon from the short beacon, the legacy general beacon can also be called a full beacon.

Figure 7:
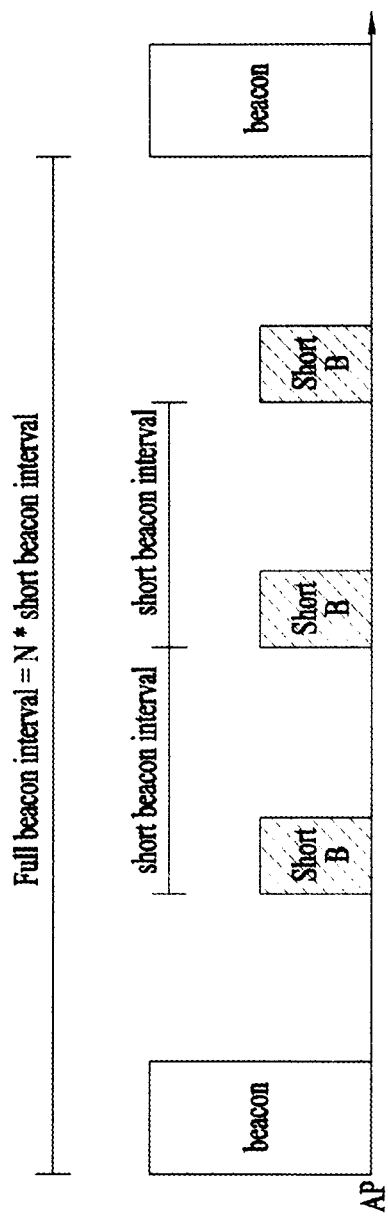
FIG. 7 is a diagram for explaining a short beacon.

FIG. 7 is a diagram for explaining a short beacon.

A short beacon interval is represented by a unit of TU. A beacon interval (i.e., beacon interval of a full beacon) can be defined by integer multiple of the short beacon interval. As shown in FIG. 7, it may be defined as 'Full beacon interval=N*short beacon interval' (where N is equal to or greater than 1). For instance, a full beacon is transmitted once and a short beacon can be transmitted one or more times before a next full beacon is transmitted. In an example shown in FIG. 7, a short beacon (short B) is transmitted 3 times during a full beacon interval.

An STA can determine whether a network for which the STA is searching is available using an SSID (or a compressed SSID) included in a short beacon. The STA may be able to transmit an association request to a MAC address of an AP included in a short beacon, which is transmitted by a network preferred by the STA. Since a short beacon is more frequently transmitted compared to a full beacon in general, an unassociated STA can promptly establish an association by supporting a short beacon. If it is necessary for the STA to have additional information to establish an association, the STA can transmit a probe request to a preferred AP. And, synchronization can be performed using timestamp information included in the short beacon. And, it is able to notify whether system information (network information or a system parameter. In the following, the system information and the network information are commonly called "system information) is changed via the short beacon. If system information is changed, the STA can obtain the changed system information via a full beacon. And, the short beacon may include a TIM. In particular, the TIM can be provided by a full beacon or a short beacon.

Figure 8:
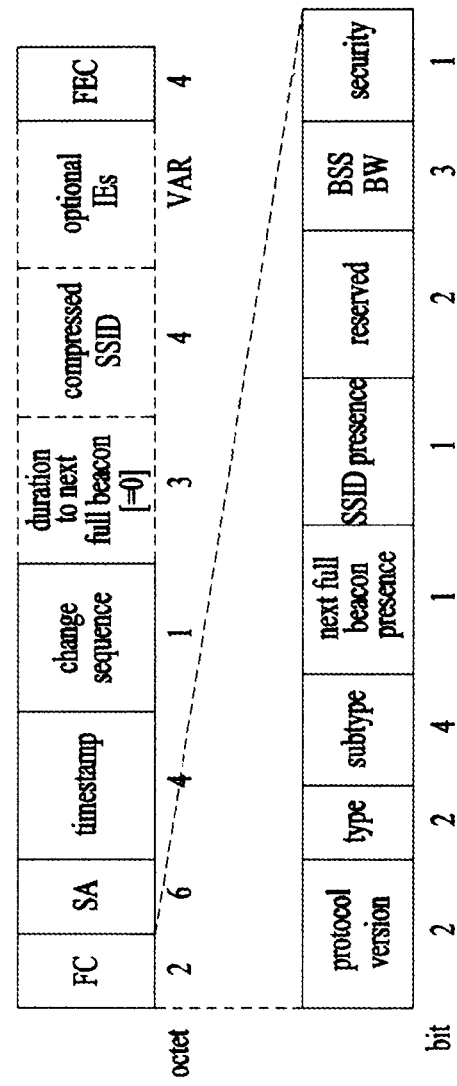
FIG. 8 is a diagram for explaining exemplary fields included in a short beacon.

FIG. 8 is a diagram for explaining exemplary fields included in a short beacon.

An FC (frame control) field can include a protocol version, a type, a sub type, a next full beacon present, SSID present, a BSS BW (bandwidth), and a security field. The FC field may have a length of 2 octets.

Among the sub fields of the FC field, the protocol version field is defined by 2-bit length and can be basically configured by a value of 0. The type field and the sub type field can be defined by 2-bit length and 4-bit length, respectively. Both the type field and the sub type field can indicate a function of a frame (e.g., it may be able to indicate that a frame corresponds to a short beacon frame). The next full beacon present field is defined by 1-bit length and can be configured by a value indicating whether a duration to next full beacon field (or information on a next TBTT) is included in a short beacon frame. The SSID present field is defined by 1-bit length and can be configured by a value indicating whether a compressed SSID field exists in a short beacon frame. The BSS BW field is defined by 3-bit length and can be configured by a value indicating a bandwidth (e.g., 1, 2, 4, 8 or 16 MHz) in which a BSS is currently operating. The security field is defined by 1-bit length and can be configured by a value indicating whether an AP corresponds to an RSNA AP. Besides, the remaining bits (e.g., 2 bits) can be reserved.

Subsequently, an SA (source address) field may correspond to a MAC address of an AP transmitting a short beacon in a short beacon frame. The SA field may have a length of 6 octets.

A timestamp field may include LSB (least significant bit) 4 bytes (i.e., 4 octets) of timestamp of an AP. This is because, although the LSB 4 bytes are provided only instead of total timestamp, it is sufficient for an STA, which has already received the total timestamp before (e.g., associated STA), to perform synchronization using the LSB 4 bytes.

A change sequence field can include information indicating whether system information is changed. Specifically, when critical information (e.g., information on a full beacon) of a network changes, a change sequence counter increases by 1. The change sequence field is defined by a length of 1 octet.

A duration to next full beacon field may or may not be included in a short beacon. This field can inform an STA of a duration to a next full beacon transmission timing on the basis of transmission timing of a corresponding short beacon. Hence, having received a short beacon, an STA operates in a doze (or sleep) mode until a next full beacon, thereby reducing power consumption. Or, the duration to next full beacon field can be configured by information indicating a next TBTT. For instance, this field can be defined by a length of 3 octets.

A compressed SSID field may or may not be included in a short beacon. The compressed SSID field can include a part of SSID of a network or a hashing value of the SSID. It is able to permit an STA, which is already know the network, to discover the network using the SSID. The compressed SSID field can be defined by a length of 4 octets.

A short beacon frame can include an additional or an optional field or information elements (IE) as well as the aforementioned exemplary fields.

An FEC (forward error correction) field can be used for a usage of investigating whether a short beacon frame has an error and can be configured by an FCS field. The FEC field can be defined by a length of 4 octets.

Although an AP operates in a manner of periodically transmitting a full beacon frame including system information in a legacy wireless LAN environment, the full beacon frame including the system information may not always be periodically transmitted in an enhanced wireless LAN environment. For instance, if there is no associated STA in environment such as home LAN and the like, the AP may not transmit a beacon. Or, although a full beacon frame is periodically transmitted, a duration to next full beacon field may not be included in a short beacon to reduce overhead of the short beacon. In this case, the AP sets a value of the duration to next full beacon field in the FC field of the short beacon frame to 0 and may be then able to transmit a short beacon not including the duration to next full beacon field.

In this case, if the AP does not inform the STA that the AP does not transmit a full beacon, the STA continuously attempts to receive a full beacon and repeatedly fails to receive the full beacon, thereby increasing power consumption of the STA. And, if information on timing capable of receiving a next full beacon is not included in a short beacon, although the STA receives the short beacon, the STA continuously attempts to receive a full beacon until the full beacon is actually transmitted, thereby increasing power consumption of the STA. Hence, if the AP promptly informs the STA that the AP does not transmit the full beacon or transmission of a next full beacon is not periodically performed, it may be able to reduce power consumption of the STA.

When the STA determines that the AP does not transmit a full beacon, the STA obtains system information via a probe request/response operation without waiting for a full beacon and may be then able to efficiently perform an operation of establishing association with the AP. For instance, having received a probe request frame from the STA, the AP can transmit a probe response frame including system information (e.g., an SSID, supported rates, a FH parameter set, a DSSS parameter set, a CF parameter set, an IBSS parameter set, a country IE and the like) to the STA in response to the probe request frame. By doing so, the STA can establish association with the AP in a manner of obtaining the system information provided via the probe response frame and performing association request/response.

Since a full beacon including system information is periodically transmitted in a legacy wireless LAN operation, if the system information is changed, an STA can obtain the changed system information by receiving a next beacon. Yet, in environment in which the full beacon including the system information is not periodically transmitted, the STA may not be able to properly obtain the changed system information on appropriate timing. In this case, the STA is unable to properly work in the corresponding wireless LAN network.

If an AP receives a request frame (e.g., a probe request frame or an SI update request frame) including a change sequence value of an STA from the STA, the AP can transmit a response frame (e.g., a probe response frame or an SI update response frame) including a current value for information element(s) changed in current system information to the STA with reference to the change sequence value of the STA.

In order for the AP to determine a changed part in the current system information compared to previous system information (e.g., system information stored in the STA) and transmit the changed part, the AP should store system information corresponding to a previous change sequence value. In this case, the AP can store an element ID of a changed information element (IE) only instead of the IE itself of the changed system information.

In system information, an element ID for a changed IE can be given as shown in Table 2 in the following.

TABLE 2

| Information Element | Element ID |
| --- | --- |
| Inclusion of a Channel Switch Announcement | 37 |
| Inclusion of an Extended Channel Switch Announcement | 60 |
| Modification of the EDCA parameters | 12 |
| Inclusion of a Quiet element | 40 |
| Modification of the DSSS Parameter Set | 3 |
| Modification of the CF Parameter Set | 4 |
| Modification of the FH Parameter Set | 8 |
| Modification of the HT Operation element | 45 |
| Modification of the Channel Switch Assignment | 35 |
| ... | ... |

If an element ID for a changed IE is given as shown in an example of Table 2, a change sequence stored in the AP and the element ID for the changed IE can be mapped to each other according to a change of system information.

For instance, assume that an EDCA parameter is changed in a change sequence 1, a CF parameter is changed in a change sequence 2, a HT operation element is changed in a change sequence 3 and an EDCA parameter is changed in a change sequence 4. In this case, an AP can store a change sequence value and an element ID corresponding to a changed IE in a manner of mapping the change sequence value to the element ID. In particular, as shown in Table 3 in the following, the AP can store a list (hereinafter called a change sequence list or a configuration change count list) for a change of system information.

TABLE 3

| | |
| --- | --- |
| Change sequence = 1 | Element ID = 12 |
| Change sequence = 2 | Element ID = 4 |
| Change sequence = 3 | Element ID = 45 |
| Change sequence = 4 | Element ID = 12 |

As shown in Table 3, an ID of an IE can be respectively mapped to a change sequence. If a size of change sequence information corresponds to 1 byte (i.e., information capable of representing one out of 256 number of cases) and a size of element ID information mapped to the change sequence information also corresponds to 1 byte, it is necessary to have a storing space of total 2 bytes to represent one element ID mapped to a change sequence.

If it is assumed that system information is changed according to the aforementioned example, an operation of updating the system information can be performed as follows.

Assume that an STA transmits a request frame (e.g., a probe request frame or an SI update request frame) including a change sequence (AP CCC)=2 and a value of a change sequence corresponding to current system information of a network corresponds to 4. In this case, an AP can determine changed system information (i.e., an element ID 45 and 12 in Table 3) based on the system information of the change sequence 2. Hence, the AP can transmit a response frame (e.g., a probe response frame or an SI update response frame) to the STA in a manner of including an HT operation element and an EDCA parameter respectively corresponding to the element ID 45 and the element ID 12 in the response frame.

As mentioned in the foregoing description, the AP can store a change sequence value and a change sequence list (or a configuration change count list, (AP) CCC list) to which an ID for system information changed in the change sequence value is mapped.

Meanwhile, if an ID for a changed element is stored in a manner of mapping the ID to a change sequence value whenever system information is changed, overhead of a memory of an AP may increase. For instance, if a size of change sequence information corresponds to 1 byte and a size of element ID information corresponds to 1 byte, it is necessary to have a storing space of total 512 bytes to store all element ID information, which are mapped to 256 change sequence values different from each other. Yet, since system information is not frequently changed in general, information (i.e., a change sequence value and an element ID value mapped to the change sequence value) on a change of old system information may be unnecessary. In particular, if the AP always maintains a storing space as much as 512 bytes to store the information on the change of the system information, unnecessary overhead may occur on the memory of the AP.

In order for the AP to reduce overhead of storing the information on the change of the system information, the AP can refresh or restrict the number of change sequence lists according to a condition such as time, number or the like.

For instance, the AP can set a limit on information to be stored according to a time condition. The AP may set a unit of a prescribed duration (e.g., several minutes, several hours, several days, several months, several years and the like) and may be then able to maintain the information for the corresponding duration only. The AP may be able to not maintain expired information or delete the expired information. For instance, if the information (i.e., a change sequence value and an element ID value mapped to the change sequence value) on the change of the system information is configured to be maintained for monthly basis, the AP may not maintain the information on the change of the system information over 1 month. In this case, a size of the storing space necessary for storing the information on the change of the system information is not constantly maintained. For instance, if a change of system information occurs 1 time for a recent month, a required storing space corresponds to 2 bytes. Yet, if a change of system information occurs 10 times for a recent month, a required storing space becomes 20 bytes. In case of setting a limit on information to be stored according to time, although the system information is frequently changed, it may be able to prevent previous system information from being lost, thereby enhancing management stability of the system information.

As a different example, an AP can set a limit on information to be stored according to a number condition of a change sequence. The number of maintained change sequences can be configured as 4, 8, 12, 16, etc. For instance, assume that the AP is configured to maintain information corresponding to 8 change sequences only and a change sequence value of current system information corresponds to 16. In this case, although the AP maintains change sequences including 9, 10, . . . , 16 and element ID information mapped to the change sequences, the AP may not maintain information on a change of previous system information (i.e., change sequences including 8, 7, 6, 5, etc. and element ID information mapped to the change sequences) or delete the information. In this case, a storing space necessary for storing the information on the change of the system information can be constantly maintained by a size of total 16 bytes by the AP. By doing so, efficiency of maintaining the system information can be enhanced.

In case of storing the information on the change of the system information, it may be able to apply a time condition and a number condition at the same time. For instance, if information on a change of system information for a recent 1 month is stored and the maximum number of storing is limited to 10, it may be able to manage the system information using a flexible storing space equal to or less than 20 bytes.

If an STA receives system information and change sequence information from an AP, which is used to be associated with the STA, via at least one selected from the group consisting of a full beacon, a probe response frame and a system information response frame, the STA may be able to continuously store the system information and the change sequence information of the previously associated AP although the STA is dissociated from the AP. When the STA stores the system information and the change sequence information of the dissociated AP, if the STA is re-associated with the dissociated AP, a fast initial link setup (FILS) can be performed. In the following, when active scanning and passive scanning are performed, an example of performing a fast initial link setup in a manner of storing the system information and the change sequence information of the dissociated AP is explained in detail with reference to FIG. 9 and FIG. 10.

Figure 9:
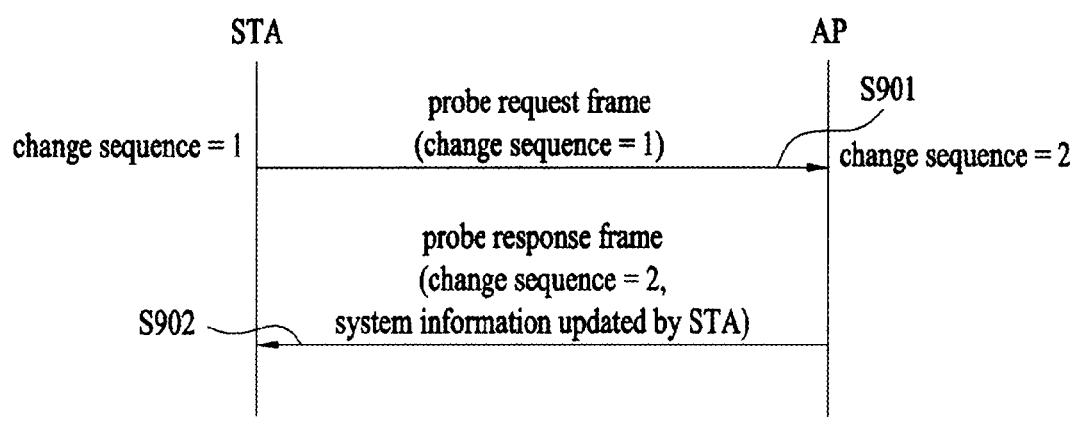
FIG. 9 is a flowchart for explaining an example of performing a fast initial link setup in case of performing active scanning.

FIG. 9 is a flowchart for explaining an example of performing a fast initial link setup in case of performing active scanning.

When an STA performs active scanning on a target AP (or BSS), if the target AP corresponds to a previously associated AP and the STA stores system information on the target AP and change sequence information, the STA can configure a probe request frame to include the change sequence information.

Having received the probe request frame including the change sequence information, the AP can compare current system information and the system information (i.e., system information corresponding to a change sequence value stored in the STA) stored in the STA with each other. If the change sequence value received from the STA is different from a current sequence value of the AP, the AP can provide a changed part among various system information to the STA in a manner of including the changed part in a probe response frame [S902].

As an example, in FIG. 9, since the change sequence (=1) of the AP received from the STA is matched with not a current change sequence value (=2) but a past change sequence value in a change sequence list, the AP can transmit a probe response frame to the STA in a manner of including a current value (i.e., a current value for changed system information element(s) compared to a previous change sequence (=1) in the current change sequence (=2)) for system information element(s) to be updated only.

As mentioned in the foregoing description, if the changed system information is included in the probe response frame only instead of all system information, it may be able to reduce a size of the probe response frame. Consequently, it may lead to a fast initial link setup.

If there is no value matched with a change sequence value received by the STA in a change sequence list stored in the AP, the AP is unable to know which system information is changed. Hence, the AP may be able to configure a probe response frame to include whole system information and a current change sequence value. In this case, system information capable of being included in the probe response frame can be restricted to non-dynamic elements only. Or, the system information capable of being included in the probe response frame can be restricted to a non-dynamic element and a partial dynamic element.

FIG. 10 is a flowchart for explaining an example of performing a fast initial link setup in case of performing passive scanning.

An STA performing passive scanning can receive a short beacon including change sequence information from an AP [A1001]. In this case, if the AP corresponds to a previously associated AP and the STA stores system information and change sequence information on the AP, the STA compares change sequence information received from the AP and the change sequence information stored in the STA with each other and may be then able to determine whether there is a changed part in the system information. If a change sequence value stored in the STA is identical to a change sequence value (i.e., a current change sequence value) received from the AP, the STA can be associated with the AP using the stored system information without receiving a full beacon.

On the contrary, if the change sequence value stored in the STA is different from the change sequence value (i.e., a current change sequence value) received from the AP, as shown in an example of FIG. 10 (a), the STA can obtain system information from the AP in a manner of receiving a full beacon at the time of transmitting the full beacon [S1002a]. Or, as shown in FIG. 10 (b), the STA can obtain system information from the AP via a probe response frame in response to the probe request frame.

As mentioned in the foregoing description, a transmission timing of a full beacon can be indicated by a duration to next full beacon field, by which the present invention may be non-limited.

In case of receiving system information via a probe request frame and a probe response frame, an STA can transmit the probe request frame in a manner of including a change sequence value stored in the STA in the probe request frame [S1002b]. If the change sequence value received from the STA is different from a change sequence value stored in the AP, in particular, if the change sequence value received from the STA is matched with not a current change sequence value but a previous change sequence value, the AP can transmit a probe response frame to the STA in a manner of including a current value for changed system information element(s) compared to a previous change sequence (=1) in a current change sequence (=2) only in the probe response frame [S1002b]. Of course, the AP can also configure the probe response frame to include all system information irrespective of a change sequence value.

If there is no value matched with the change sequence value received from the STA in a change sequence list stored in the AP, the AP is unable to know which system information is changed. Hence, the AP may be able to configure a probe response frame to include whole system information and a current change sequence value. In this case, system information capable of being included in the probe response frame can be restricted to non-dynamic elements only. Or, the system information capable of being included in the probe response frame can be restricted to a non-dynamic element and a partial dynamic element.

As mentioned in the foregoing example, if the STA stores system information and change sequence information on a dissociated AP, the STA may receive changed system information only in a manner of exchanging a probe request/response frame with each other (if a change sequence value is different from each other) or omitting to receive a full beacon (if a change sequence value is identical to each other). By doing so, it may be able to perform a fast initial link setup.

To this end, the STA can continuously store system information element(s) and change sequence information received from the AP via a probe response frame or a beacon frame (short beacon or full beacon) although the STA is dissociated from the AP.

Moreover, the AP can store previous change sequence information and changed system information whenever system information is changed. In this case, the AP can store an ID of a changed IE only instead of an information element (IE) itself of changed information.

For instance, when a change sequence value corresponds to 0, if a channel switch assignment IE is changed (added or deleted), the AP adds 1 to the change sequence value and may be then able to associate the change sequence value with an ID of the channel switch assignment ID (e.g., in case of using an ID value of information elements shown in Table 1, the AP may be able to store data such as [change sequence=1, channel switch assignment information element ID=35]. In the same principle, when a change sequence value corresponds to 1, if an EDCA parameter set information element is changed (added or deleted), the AP may be able to store data such as [2, 12] as a [change sequence, system information IE] pair. When a change sequence value corresponds to 2, if an HT operation information element is changed (added), the AP may be able to store data such as [3, 45] as a [change sequence, system information IE] pair. As mentioned in the foregoing description, the AP can generate and store a change sequence value and a change sequence list (or configuration change count list, (AP) CCC list) to which an ID for system information changed in the corresponding change sequence value is mapped.

Meanwhile, if an ID for a changed element is stored in a manner of mapping the ID to a change sequence value whenever system information is changed, overhead of a memory of an AP may increase. In order for the AP to reduce overhead of storing the information on the change of the system information, the AP can refresh or restrict the number of change sequence lists according to a condition such as time, number or the like.

As mentioned in the foregoing description, when an AP and an STA intend to transmit, receive or store changed system information, the present invention proposes to newly configure information included in a probe request frame and a probe response frame in accordance with various forms.

BSSID-AP CCC Pair

As a probe request frame applicable to the present invention, an STA can include a BSSID-AP CCC pair. In particular, in case that the STA transceives a probe request frame and a probe response frame with a plurality of APs, the present invention proposes an enhanced probe request frame and a probe response frame described in the following.

In case of performing scanning, conventionally, an STA transmits a probe request frame to an AP using a unicast scheme. In case of transmitting the probe request frame using the unicast scheme, it may be able to receive a probe response frame for a single AP. Since the STA broadcasts the probe request frame only when the STA is unable to discovery an AP after the probe request frame is transmitted using the unicast scheme, it may be difficult to say that this is an efficient method of discovering an AP in terms of discovering an AP. Hence, it is required to have a method of discovering a plurality of APs at the same time.

Embodiment of the present invention explains a method for an STA to transmit a probe request frame to an AP. Specifically, a method for an STA to transmit a probe request frame to a plurality of APs is explained in the following description.

Figure 11:
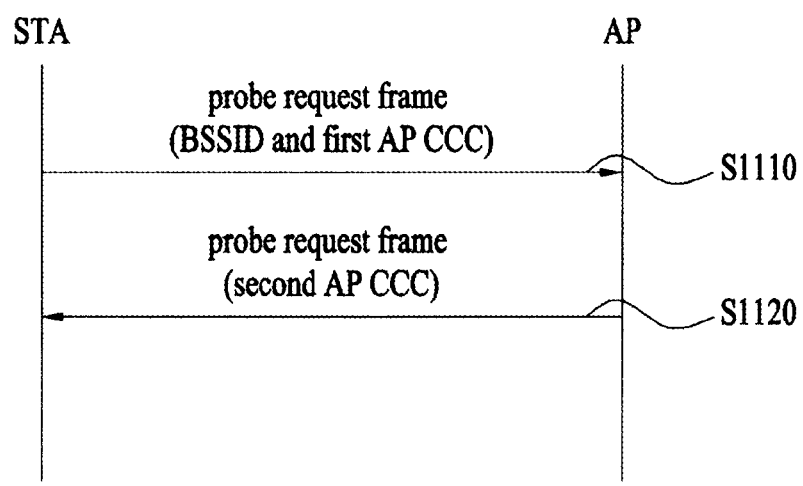
FIG. 11 is a flowchart for an example of a method of performing scanning according to the present invention.

FIG. 11 is a flowchart for an example of a method of performing scanning according to the present invention.

As shown in FIG. 11, a method for an STA to perform active scanning is explained. The STA broadcasts a probe request frame (first frame) to one or more access points (APs) [S1110] and receives a probe response (second frame) from a first AP among APs, which have received the broadcasted first frame [S1120]. The probe request frame includes one or more basic service set ID (BSSID)-AP configuration change count (AP CCC) pairs. The first AP relates to one BSSID among the one or more BSSID-AP CCC pairs. If an AP CCC value of the first AP is different from an AP CCC value paired with the BSSID, which is related to the first AP, the STA receives a probe response frame in which system information including a current AP CCC value and dynamic information of the first AP is included.

The STA can store the BSSID-AP CCC pair and the pair may have a plural number. In order to broadcast a probe request frame to a plurality of APs, the STA may have information on a plurality of the APs and the STA can generate and store the BSSID-AP CCC pair as a list form. Information included in MLME-SCAN.request information, which is stored in the STA to perform scanning, includes information shown in Table in the following.

TABLE 4

| MLME-SCAN.request( | BSSType,<br>BSSID,<br>SSID,<br>ScanType,<br>ProbeDelay,<br>ChannelList,<br>MinChannelTime,<br>MaxChannelTime,<br>RequestInformation,<br>SSID List,<br>ChannelUsage,<br>AccessNetworkType,<br>HESSID,<br>MeshID,<br>BSSIDAndAPConfigurationChangeCount List,<br>TransmissionType,<br>VendorSpecificInfo<br>) |
|---|---|

BSSIDAndAPConfigurationChangeCount List indicates information on the aforementioned BSSID-AP CCC pair. An AP can include a BSSID of the AP and an AP CCC value and an STA can store the BSSID of the AP and the AP CCC value in a list form. And, if an AP CCC value is included in response to a BSSID of each AP, the AP CCC value can be included in the list.

When an STA makes a request for scanning to an AP, in particular, when the STA transmits a probe request frame to the AP, TransmissionType corresponds to information indicating whether the probe request frame is transmitted to a plurality of APs using a broadcast scheme (0) or a unicast scheme (1). If the information is configured by the broadcast scheme (0), although a BSSID is included in the MLME-SCAN.request, the probe request frame is transmitted in a broadcast form instead of transmitting the probe request frame to the corresponding AP only. The TransmissionType can be included together when the BSSIDAndAPConfigurationChangeCount List is included in the MLME-SCAN.request information. Table 5 in the following shows a probe request frame applicable to the present invention.

FIG. 12 is a diagram for an example of BSSID-AP CCC pair list according to the present invention.

As shown in FIG. 12, since an STA used to be associated with a plurality of APs, the STA may have BSSID values of the corresponding APs. When the STA is associated with each AP, the STA can store an AP CCC value of each AP as a pair in a manner of pairing the AP CCC value with a BSSID.

TABLE 5

| Order | Information(element) | Description |
|---|---|---|
| Xx | BSSID And AP Configuration Change Count List | One or more BSSIDs and AP CCC value list are included |
| Last | Vendor Specific | One or more vendor-specific elements selectively exist after different elements |

As shown in Table 5, BSSID And AP CCC list includes one or more BSSIDs and an AP CCC value list. As mentioned earlier in the example of FIG. 12, the BSSID And AP CCC list can be stored in a form of a pair. A vendor-specific element is included in a last order of a probe request frame and the vendor-specific element is included when one or more vendor-specific elements selectively exist.

FIG. 13 is a diagram for an example of a form of BSSID-AP CCC element.

As shown in FIG. 13, one BSSID-AP CCC element can include an Element ID field, a Length field and a BSSID And AP CCC field.

The Element ID field is represented by 1-octet size and indicates BSSID And AP CCC.

The Length field indicates a length of a corresponding element and is represented by 1-octet size. A value of the Length field varies. If the number of BSSID-AP CCC pairs corresponds to N, a length of the corresponding element is determined based on the N. for instance, if the number of BSSID-AP CCC pairs corresponds to 4 (N=4), the length becomes 28 bytes (4*7=28).

The BSSID and AP CCC can include a list of a BSSID of 6 bytes and an AP CCC of 1 byte. A destination address (receiver address) of a MAC header of a probe request frame including the aforementioned information can include a broadcast address.

It may consider a case opposite to a case of broadcasting to a plurality of APs. When an STA transmits a probe request frame to a plurality of APs, having received the broadcasted probe request frame, an AP can transmit a probe response frame to the STA. In this case, if one or more STAs transmit a probe request frame and an AP receives a plurality of probe request frames, the AP transmits a probe response frame to a plurality of the STAs. In this case, the probe response frame can be transmitted in a broadcast form instead of a unicast form. The AP also determines whether the probe response frame is transmitted in unicast or broadcast and may be then able to transmit the probe response frame to the STA.

For instance, a value of a destination address field of a probe response frame can be configured by a broadcast identifier (e.g., wildcard value). In order for all STAs belonging to a BSS to receive data of a probe response frame transmitted in a broadcast form, the most robust modulation and coding scheme (e.g., QPSK (Quadrature Phase Shift Keying) 1/12, 2 repetition) can be applied. A probe response frame is shown in Table 6 in the following.

TABLE 6

| Order | Information(element) | Description |
|---|---|---|
| Xx | AP Configuration Change Count | If dot11FILSActived is true, AP CCC is selectively included |
| Last - 1 | Vendor-specific | One or more vendor-specific elements are selectively included after different elements |
| Last -n | Requested Elements | If dot11MultiDomaionCapacityActived is true, elements requested by requested elements of probe request frame are included |

As shown in Table 6, if dot11FILSActived corresponds to a true value, an AP CCC value is included in a probe response frame and a vendor-specific element is selectively included. If dot11MultiDomaionCapacityActived is true, requested elements can include elements requested by requested elements of a probe request frame.

Update of System Information

As mentioned in the foregoing description, an STA can receive precise system information of an AP via a BSSID-AP CCC pair. Since the system information of the AP is continuously changing due to surrounding environment, it is necessary to inform a neighboring STA of system information to perform a precise association and communication. As mentioned earlier in FIG. 7, transmission and reception of system information can be performed in a manner that an STA receives the system information included in a probe request/response frame from an AP in the course (active scanning) of scanning the AP. Hence, current system information of the AP can be included in the probe response frame.

Hence, in order to help update of the STA, the AP can transmit a probe response frame to the STA in a manner of including currently using network system information in the probe response frame. In this case, a method of transmitting system information to an STA is proposed.

When dot11FILSActivated is true, if a change (update) occurs in system information, an AP can transmit a beacon frame or a probe response frame to an STA in a manner of including an AP CCC value in the beacon frame or the probe response frame. In this case, an optimized probe response frame transmitted to the STA is shown in Table 7 in the following.

TABLE 7

| Order | Information | Description |
|---|---|---|
| 1 | Timestamp | |
| 2 | Beacon interval | |
| 3 | Capacity | |
| 4 | AP Configuration Change Count | AP Configuration Change Count element is included when dot11FILSActivated is true. |
| 5 | BSS load | BSS load element is included when both dot11QosOption-Implemented and dot11BSSSLoadInplemented are true. Although this element changes, AP CCC value does not increase |
| 6 | TPC report | TPC report element is included when either dot11SpectrumManagementRequired or dot11RadioMeasurementActivated is true. Although this element changes, AP CCC value does not increase |
| 7 | BSS Average Access Delay | BSS Average Access Delay element is selectively included when dot11RMBSSAverageAccessDelayActivated is true and AP Average Access Delay field is not 255 (not measurable). Although this element changes, AP CCC value does not increase. |
| 8 | BSS Available Admission | BSS Available Admission Capacity is selectively included. Although this element changes, AP CCC value does not increase. If dot11RMBSSAvailableAdmissionCapacityActivated is true, exception in the following can be included. 1) When Available Admission Capacity Bitmask corresponds to 0 (Available Admission Capacity List does not include entry) or 2) When BSS load element is included and Available Capacity Bitmask corresponds to 256 (Available Admission Capacity List includes AC_VO entry only) |
| 9 | BSS AC Access Delay | BSS AC Access Delay is selectively included when dot11RMBSSAverageAccessDelayActivated is true and at least one or more fields of element are not 255 (not measurable). Although this element changes, AP CCC value does not increase |
| 10 | Time Advertisement | Time Advertisement element is selectively included when dot11MgmtOptionUTCTSFOffsetActivated is true. Although this element changes, AP CCC value does not increase. |
| Last | Updated elements | When one or more elements are required to be updated by STA, the elements necessary to be updated by the STA are included. |

An AP CCC value is represented in an AP CCC field. The AP CCC field has a size of 1 octet and can be initially configured by 0. The AP CCC value increases when update occurs in elements of a beacon frame or a probe response frame. The AP CCC value may increase by 1. Yet, dynamic information described in the following are included in system information and the AP CCC value may not increase although update occurs. Since the dynamic information are frequently changing, if the AP CCC value is increase whenever the dynamic information are changed, the AP CCC value may act as considerable overhead to an AP and an STA. Hence, in order to reduce the overhead, the present invention proposes not to increase the AP CCC value although the dynamic information is changed.

The dynamic information includes time stamp, a BSS load, beacon timing, time advertisement, BSS AC access delay, BSS average access delay, BSS available admission capacity and TPC report element. A scanning process is explained in the following.

In case of a non-AP STA, if dot11FILSActived is true, a BSS information set can be maintained by a BSS information set of an AP previously obtained by an STA in a manner of associating with the AP. In this case, the BSS information set corresponds to an information set included in a beacon frame or a probe response frame transmitted by the AP. According to the present invention, list information of a BSSID-AP CCC pair can be included in the BSS information set as information stored in the STA. Hence, the STA can store information on APs previously associated with the STA, i.e., a BSSID and an AP CCC value as a pair. Hence, when a non-AP STA transmits a probe request frame, the non-AP STA can transmit a probe request frame including an AP CCC value to an AP based on BSS information set of a previously associated AP.

When dot11FILSActived is true, an AP can maintain an AP CCC list with a previous value. The AP CCC list can consist of a previous AP CCC value and IDs of changed elements of each AP CCC value. In this case, the AP can store the AP CCC value of the AP CCC list in a manner of maintaining the AP CCC value by a restricted number. The AP CCC list possessed by the AP can further include a change history of the AP CCC value increased by the AP. The AP can more precisely store a change history of system information via the history of the changed AP CCC value.

Having received the probe request frame in which the BSSID-AP CCC pair is included from the STA, the AP can compare an AP CCC value of the AP and an AP CCC value of the STA with each other. The AP is able to know an AP CCC value to which a BSSID of the AP is mapped from information in which one or more BSSID-AP CCC pairs are included. Hence, the AP can compare the AP CCC value of the AP and the AP CCC value stored in the STA with each other.

The AP always includes current system information. Yet, since the STA is unable to reflect the system information of the AP in real time, the AP CCC value of the STA may be different from the AP CCC value of the AP. After the two AP CCC values are compared with each other, if the two AP CCC values are identical to each other, the AP can transmit an optimized probe response frame. In this case, the optimized probe response frame can include essential field information of system information and dynamic information supported by the STA and the AP only. For instance, the essential field information may correspond to timestamp, capability, a beacon interval and the like. A timestamp value is an important element in synchronizing the AP and the STA with each other and the beacon interval is mainly used when the STA receives a beacon frame including TIM.

If the two AP CCC values are different from each other, the AP can include essential field information, dynamic information supported by the STA and the AP and information elements necessary to be updated by the STA in the optimized probe response frame. If the STA determines an element as the element of which update is not necessary, the AP can transmit the optimized probe response frame in a manner of excluding the element from the optimized probe response frame.

If the probe request frame transmitted to the AP by the STA is determined as invalid, the AP can transmit an original probe response frame to the STA instead of the optimized probe response frame.

When the element of which update is necessary is transmitted only, the AP can minimize a burden on probe response frame capacity. In addition, in case of receiving a probe response frame, the STA can minimize overhead of the probe response frame reception.

Dynamic Information Format

In order to transmit current system information of an AP to an STA, the current system information can be transmitted in a manner of being included in a probe response frame (refer to the step S1120 in FIG. 11). In this case, an optimized probe response frame can be configured by identifying whether a type of the system information corresponds to dynamic information or non-dynamic information. This is because, since the dynamic information is changed by a relatively short interval compared to the non-dynamic information, it is unable to continuously reflect the dynamic information. In the following, a method of configuring a format of the dynamic information and a method of configuring the optimized probe response frame are explained. The dynamic information is explained in more detail.

FIG. 14 is a diagram for an example of a dynamic information list element according to the present invention.

As shown in FIG. 14, a dynamic information list can include an element ID field, a length field, a dynamic information presence bitmap field, a TPC report field, a BSS load field, a BSS average access delay field, a BSS AP access delay field, a time advertisement field, a BSS available admission field and a beacon timing field.

In case of transmitting an optimized probe response frame in a manner of including dynamic information in the optimized probe response frame without increasing an AP CCC value for the dynamic information, the dynamic information always includes overhead of 2 bytes (1 byte-element ID and 1-byte length) for each information element. Hence, the overhead can be reduced using the dynamic information presence bitmap field.

FIG. 15 is a diagram for a dynamic information presence bitmap field according to the present invention.

As shown in FIG. 15, a dynamic information presence bitmap field includes a dynamic information part of FIG. 14, i.e., a TPC report field, a BSS load field, a BSS average access delay field, a BSS AP access delay field, a time advertisement field, a BSS available admission field and a beacon timing field. Hence, the dynamic information presence bitmap corresponds to a bitmap indicating whether each dynamic information is included in a probe response frame and can be mapped to each dynamic information.

FIG. 16 is a diagram for a format of a TPC report field according to the present invention.

As shown in FIG. 16, a TPC report field includes a transmit power field and a link margin field. Since both information have a size of 1 octet, respectively, a length of the TPC report field corresponds to total 2 octets.

FIG. 17 is a diagram for a format of a BSS load field according to the present invention.

As shown in FIG. 17, a BSS load field includes a station count field, a channel utilization field and an available admission capacity field. The station count field has a size of 2 octets, the channel utilization field has a size of 1 octet and the available admission capacity field has a size of 2 octets. Hence, the BSS load field is represented by a size of total 5 octets.

FIG. 18 is a diagram for a format of a BSS average access delay field according to the present invention.

As shown in FIG. 18, a BSS average access delay field includes an AP average access delay field. The AP average access delay field has a size of 1 octet. Hence the BSS average access delay field is represented by a size of total 1 octet.

FIG. 19 is a diagram for a format of a BSS AC access delay field according to the present invention.

As shown in FIG. 19, a BSS AC access delay field includes an access category access delay field and the access category access delay field has a size of 4 octets. Hence, the BSS AC access delay field is represented by a size of total 4 octets.

FIG. 20 is a diagram for a format of a time advertisement field according to the present invention.

As shown in FIG. 20, a time advertisement field can include a length field, a timing capacity field, a time value field (optional), a time error field (optional) and a time update field (optional).

The length field and the timing capacity field have a size of 1 octet, respectively. Yet, since the time value field, the time error field and the time update field are optionally included, the time advertisement field corresponds to a variable field. Hence, the length field can be included in the fore part of the time advertisement field. A value of the length field can be configured by one of values ranging from 1 to 17.

FIG. 21 is a diagram for a format of a BSS available admission field according to the present invention.

As shown in FIG. 21, a BSS available admission field can include a length field, an available admission capacity bitmask field and an available admission capacity list field. If the length field has a size of 1 octet, the available admission capacity bitmask field has a size of 2 octets and the available admission capacity list field has a size of 2*(the total number of non-zero bits in the available admission capacity bitmask field). Since the BSS available admission field also corresponds to a variable field, the length field can be included in the fore part of the BSS available admission field. A value of the length field can be configured by one of values ranging from 2 to 26.

FIG. 22 is a diagram for a format of a beacon timing field according to the present invention.

As shown in FIG. 22, a beacon timing field can include a length field, a report control field and one or more beacon timing information fields. The length field and the report control field have a size of 1 octet, respectively. Each of the beacon timing information fields has a size of 6 octets. A value of the length field can be configured by one of values ranging from 1 to 53.

Optimized Probe Response Frame

FIG. 23 is a diagram for an example of an optimized probe response frame according to the present invention.

As shown in FIG. 23, an optimized probe response frame can include a FC field, a DA field, and an SA field. In order to represent update information, the optimized probe response frame can include a time stamp field, a change sequence (or AP CCC) field, a dynamic information list field, an updated information element field and a FCS field. In addition, a capability field or a beacon interval field can be included in the optimized probe response frame as default.

The timestamp field should be included in a probe response frame for timing synchronization between an STA and an AP and the change sequence (or AP CCC) field is also included in the probe response frame to identify whether there is a change value. Since dynamic information does not increase AP CCC value included in a probe response frame although a change occurs, it is necessary to have a method for an STA to identify whether a change occurs. Hence, the dynamic information list field may reflect the dynamic information. The updated information element field includes updated information.

FIG. 24 is a diagram for an example of a dynamic information list according to the present invention.

As shown in FIG. 24, a dynamic information list can include a dynamic information presence bitmap field, a TPC report field, a BSS load field, a BSS average access delay field, a BSS AC access delay field, a time advertisement field, a BSS available admission field and a beacon timing field. The dynamic information list corresponds to information indicating dynamic information included in a probe response frame. The dynamic information presence bitmap field included in the dynamic information list is explained in detail. In case of other fields, the fields can be represented in a manner of being identical to the fields defined in FIG. 16 to FIG. 22.

Figures 25, 26:
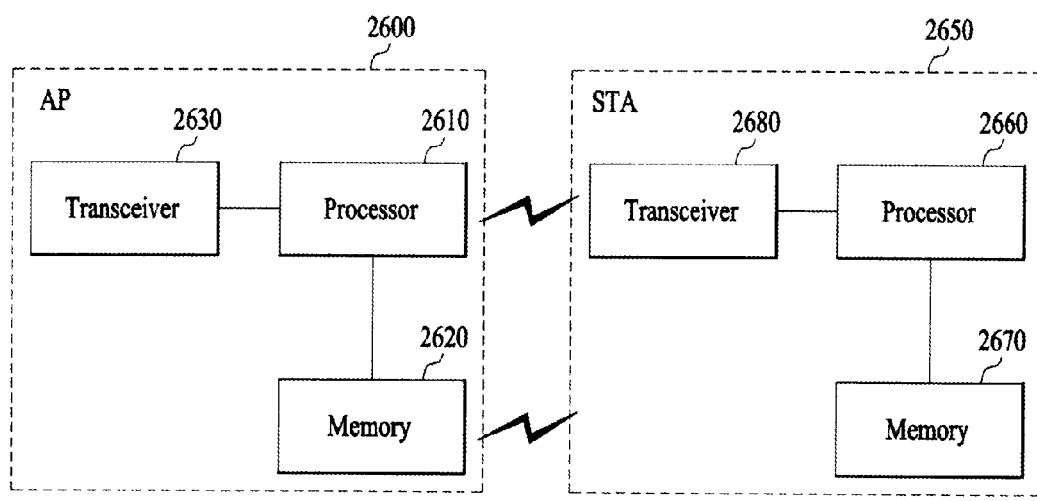
FIG. 25 is a diagram for a dynamic information presence bitmap field according to the present invention.
FIG. 26 is a block diagram for an exemplary configuration of an AP device (or base station device) and an STA device (or a user equipment device) according to one embodiment of the present invention.

FIG. 25 is a diagram for a dynamic information presence bitmap field according to the present invention.

As shown in FIG. 25, a dynamic information presence bitmap field corresponds to a bit indicating whether there exist dynamic information. The dynamic information presence bitmap field can include a TPC report field, a BSS load field, a BSS average access delay field, a BSS AC access delay field, a time advertisement field, a BSS available admission field and a beacon timing field. Each field may have a size of 1 bit.

FIG. 26 is a block diagram for an exemplary configuration of an AP device (or base station device) and an STA device (or a user equipment device) according to one embodiment of the present invention.

An AP 2600 can include a processor 2610, a memory 2620 and a transceiver 2630. An STA 2650 can include a processor 2660, a memory 2670 and a transceiver 2680.

The transceiver 2630/2680 can transmit and receive a radio signal. For instance, the transceiver can implement a physical layer according to IEEE 802 system.

The processor 2610/2660 can implement a physical layer and/or a MAC layer according to IEEE 802 system in a manner of being connected with the transceiver 2630/2680. The processor 2610/2660 can be configured to perform an operation according to a combination of one or more embodiments among the aforementioned various embodiments of the present invention.

And, a module configured to implement an operation of an AP and an STA according to the aforementioned various embodiments of the present invention can be stored in the memory 2620/2670 and the operation can be executed by the processor 2610/2660. The memory 2620/2670 is included in the inside of the processor 2610/2660 or is installed at the outside of the processor 2610/2660 and can be connected with the processor 2610/2660 by a well-known means.

Explanation on the AP device 2600 and the STA device 2650 can be applied to a base station and a user equipment in a different wireless communication system (e.g., LTE/LTE-A system), respectively.

A concrete configuration of the AP and the STA device can be implemented in a manner of making items of the aforementioned various embodiments of the present invention to be independently applied or making two or more embodiments to be simultaneously applied. For clarity, overlapped contents are omitted.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

Among elements of a device for the AP/STA, a structure of a processor 11 and a structure of a processor 21 are explained in more detail.

Figure 27:
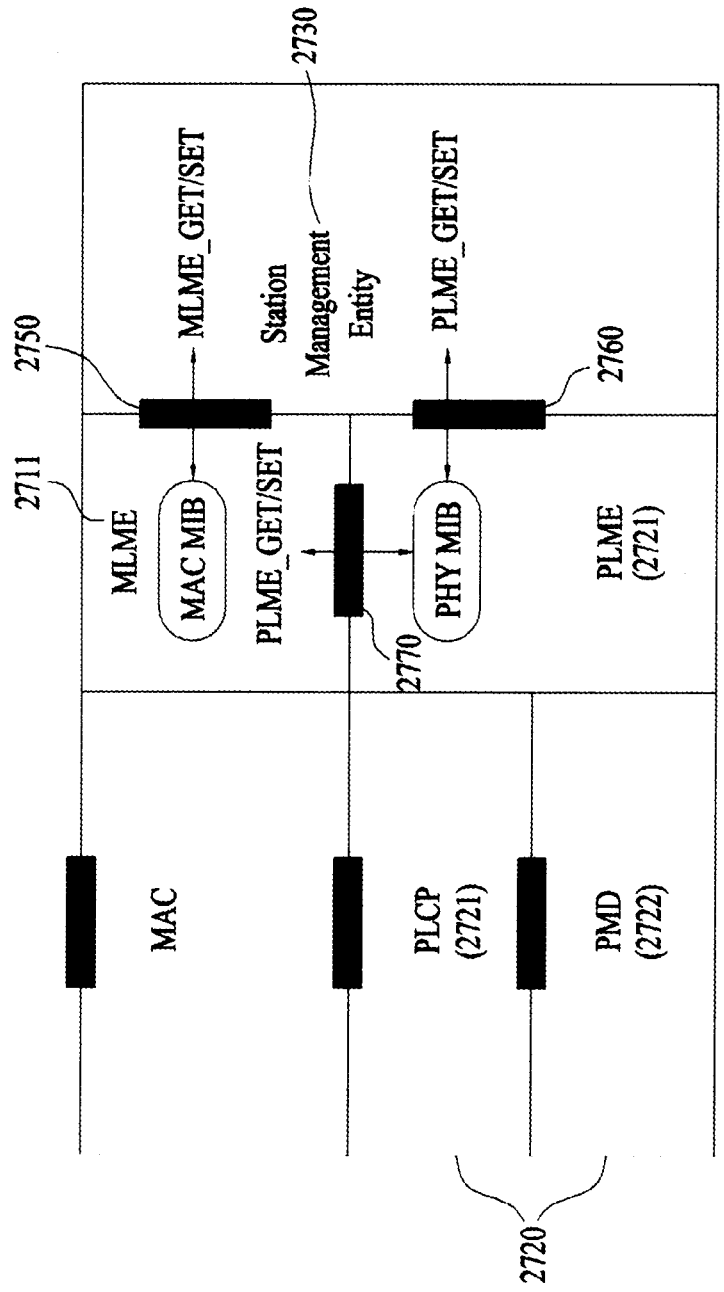
FIG. 27 is a diagram for an exemplary structure of a processor of an AP device or a processor of an STA device according to one embodiment of the present invention.

FIG. 27 is a diagram for an exemplary structure of a processor of an AP device or a processor of an STA device according to one embodiment of the present invention.

The processor of the AP or the processor of the STA 2600/2650 shown in FIG. 26 may have a structure of a plurality of layers. FIG. 27 shows a MAC sublayer 2710 of a DLL (data link layer) and a physical layer 2720 among a plurality of the layers. As shown in FIG. 27, the PHY 2720 can include a PLCP (physical layer convergence procedure) entity 2721 and a PMD (physical medium dependent) entity 2722. Both the MAC sublayer 2710 and the PHY 2720 have a management entity conceptually called a MLME (MAC sublayer management entity), respectively. These entities 2711/2721 provides a layer management service interface in which a layer management function is operated.

In order to provide a precise MAC operation, an SME (station management entity) 2730 exists in each STA. The SME 2730 corresponds to a layer-independent entity capable of being existed in a separate management plane or capable of being seen as off to the side. Although precise functions of the SME 2730 are not explained in detail in this disclosure, this entity 2730 collects layer-dependent states from various layer management entities (LMEs) and is in charge of a function of similarly configuring values of layer-specific parameters in general. Generally, the SME 2730 performs the aforementioned functions on behalf of a system management entity and can implement a standard management protocol.

Entities shown in FIG. 27 interact with each other in various schemes. FIG. 27 shows several examples of exchanging GET/SET primitives. A XX-GET.request primitive is used to request a value of a given MIB attribute (management information-based attribute information). A XX-GET.confirm primitive returns an appropriate MIB attribute information value when a status corresponds to "success". Otherwise, the XX-GET.confirm primitive is used to return an error indication in a status field. A XX-SET.request primitive is used to request an indicated MIB attribute to be configured by a given value. When the MIB attribute indicates a specific operation, it means that the specific operation is requested to be performed. A XX-SET.confirm primitive confirms that an indicated MIB attribute is configured by a requested value when a status corresponds to "success". Otherwise, the XX-SET.confirm primitive is used to return an error condition to a status field. When the MIB attribute indicates a specific operation, it confirms that the specific operation is performed.

As shown in FIG. 27, the MLME 2711 and the SME 2730 can exchange various MLME_GET/SET primitives with each other via MLME SAP 2750. As shown in FIG. 23, various PLCM_GET/SET primitives can be exchanged between the PLME 2721 and the SME 2730 via PLME_SAP 2760 and can be exchanged between the MLME 2711 and the PLME 2770 via MLME-PLME_SAP 2770.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although various embodiments according to the present invention are explained centering on IEEE 802.11 system, the embodiments of the present invention can also be applied to various mobile communication systems in an identical scheme.

What is claimed is:

1. A method of scanning, performed by a station (STA) in a wireless communication system, the method comprising:
broadcasting a first frame, by the STA, to one or more access points (APs); and
receiving a second frame from a first AP among the one or more APs, which have received the broadcasted first frame,
wherein the first frame comprises one or more basic service set ID (BSSID)-AP configuration change count (AP CCC) pairs,
wherein the first AP is associated with a BSSID of a BSSID-AP CCC pair among the one or more BSSID-AP CCC pairs, and
wherein when an AP CCC value of the first AP is different from an AP CCC value paired with the BSSID associated with the first AP, the second frame contains system information of the first AP, which includes a current AP CCC value of the first AP, an updated information element and dynamic information,
wherein the AP CCC value of the first AP is maintained when a dynamic information update occurs, and
wherein the AP CCC value of the first AP increases by 1 when a system information update, not including a dynamic information update, occurs.

2. The method of claim 1, wherein the dynamic information comprises at least one of a time stamp, a BSS load, beacon timing, a time advertisement, a BSS AC access delay, a BSS average access delay, BSS available admission capacity and a TPC report element.

3. The method of claim 1, wherein the first AP maintains an AP CCC list which includes a change history of the AP CCC being increased.

4. The method of claim 1, wherein the STA stores BSSID-AP CCC pair information of one or more APs previously associated with the STA.

5. The method of claim 1, wherein the AP CCC value is initially set to 0.

6. The method of claim 1, wherein the AP CCC value is defined by a size of 1 octet and set to a value ranging from 0 to 255.

7. The method of claim 1, wherein the first frame is a probe request frame and wherein the second frame is a probe response frame.

8. The method of claim 1, wherein when the STA corresponds to a non-AP STA, the first frame is transmitted to a previously associated AP by checking information on the BSSID-AP CCC pair.

9. A method of supporting scanning by an access point (AP) in a wireless communication system, the method comprising:
receiving a probe request frame containing one or more basic service set ID (BSSID)-configuration change count (AP CCC) pairs, broadcasted by a station (STA); and
transmitting a probe response frame to the STA in response to the received probe request frame,
wherein the AP is associated with a BSSID of a BSSID-AP CCC pair among the one or more BSSID-AP CCC pairs, and
wherein when an AP CCC value of the AP is different from an AP CCC value paired with the BSSID associated with the AP, the probe response frame contains a current AP CCC value of the AP, an updated information element and dynamic information,
wherein the AP CCC value of the AP is maintained when a dynamic information update occurs, and
wherein the AP CCC value of the AP increases by 1 when a system information update, not including a dynamic information update, occurs.

10. The method of claim 9, wherein when the AP CCC value contained in the probe request frame transmitted by the STA is determined to be invalid, the current AP CCC value of the AP is transmitted in a legacy probe response frame.

11. The method of claim 9, wherein the dynamic information comprises at least one of a time stamp, a BSS load, beacon timing, a time advertisement, a BSS AC access delay, a BSS average access delay, BSS available admission capacity and a TPC report element.

12. The method of claim 9, wherein the first AP maintains an AP CCC list which includes a change history of the AP CCC being increased.

13. The method of claim 9, wherein the AP CCC value is initially set to 0.

14. The method of claim 9, wherein the AP CCC value is defined by a size of 1 octet and set to a value ranging from 0 to 255.

15. The method of claim 9, wherein the first frame is a probe request frame and wherein the second frame is a probe response frame.

16. The method of claim 9, wherein when the STA corresponds to a non-AP STA, the first frame is transmitted to a previously associated AP by checking information on the BSSID-AP CCC pair.

17. A station (STA) performing link setup in a wireless communication system, comprising:
a transceiver; and
a processor that:
broadcasts a probe request frame to one or more access points (APs) using the transceiver,
receives a probe response frame from a first AP among the one or more APs, which have received the broadcasted probe request frame, using the transceiver,
wherein the probe request frame comprises one or more basic service set ID (BSSID)-AP configuration change count (AP CCC) pairs,
wherein the first AP is associated with a BSSID of a BSSID-AP CCC pair among the one or more BSSID-AP CCC pairs, and
wherein when an AP CCC value of the first AP is different from an AP CCC value paired with the BSSID, which is associated with the first AP, the probe response frame contains a current AP CCC value of the first AP, an updated information element and dynamic information, wherein the AP CCC value of the first AP is maintained when a dynamic information update occurs, and wherein the AP CCC value of the first AP increases by 1 when a system information update, not including a dynamic information update, occurs.

18. An access point (AP) performing link setup in a wireless communication system, comprising:

a transceiver; and a processor that:

receives a probe request frame containing one or more basic service set ID (BSSID)-configuration change count (AP CCC) pairs, broadcasted by a station (STA); and transmits a probe response frame to the STA in response to the received probe request frame, wherein the AP is associated with a BSSID of a BSSID-AP CCC pair among the one or more BSSID-AP CCC pairs, and wherein when an AP CCC value of the AP is different from an AP CCC value paired with the BSSID associated with the AP, the probe response frame contains a current AP CCC value of the AP, an updated information element and dynamic information, wherein the AP CCC value of the AP is maintained when a dynamic information update occurs, and wherein the AP CCC value of the AP increases by 1 when a system information update, not including a dynamic information update, occurs.

* * * * *